(12) United States Patent
Sadakuni

(10) Patent No.: US 6,604,091 B2
(45) Date of Patent: Aug. 5, 2003

(54) INTERACTIVE ARTIFICIAL INTELLIGENCE

(75) Inventor: Naoki Sadakuni, Iwata (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 09/393,146

(22) Filed: Sep. 10, 1999

(65) Prior Publication Data

US 2003/0069863 A1 Apr. 10, 2003

(51) Int. Cl.$^7$ ................................. G06F 15/18
(52) U.S. Cl. ..................................... 706/14
(58) Field of Search ................... 706/11, 25, 20, 706/14

(56) References Cited

U.S. PATENT DOCUMENTS

| | | | |
|---|---|---|---|
| 5,682,469 A | 10/1997 | Linnett et al. | 345/473 |
| 5,852,819 A | 12/1998 | Beller | 707/1 |
| 5,870,730 A * | 2/1999 | Furuya et al. | 706/47 |
| 5,999,895 A | 12/1999 | Forest | 704/1 |
| 5,999,908 A | 12/1999 | Abelow | 705/1 |
| 6,005,549 A | 12/1999 | Forest | 345/157 |
| 6,034,652 A | 3/2000 | Freiberger et al. | 345/730 |
| 6,085,183 A * | 7/2000 | Horn et al. | 706/45 |
| 6,195,651 B1 | 2/2001 | Handel et al. | 707/2 |
| 6,219,657 B1 * | 4/2001 | Hatayama | 706/14 |

FOREIGN PATENT DOCUMENTS

| JP | 10-328422 | 12/1998 |
|---|---|---|
| JP | 11-126017 | 5/1999 |

OTHER PUBLICATIONS

Takanori Shibata et al; Artificial Emotional Creature for Human–Machine Interaction; Jan. 1997; IEEE; 0-7803-4053;2269-2274.*

Hiroshi Kobayashi et al; Facial Interaction between Animated 3D Face Robot and Human Beings; Jan. 1997; IEEE; 0-7803-4053; 3732-3737.*

* cited by examiner

Primary Examiner—John Follansbee
Assistant Examiner—Joseph P. Hirl
(74) Attorney, Agent, or Firm—Knobbe, Martens, Olson & Bear LLP

(57) ABSTRACT

Behavior of a device is modified based on the device's experience. The device comprises: (i) a sensing unit for sensing signals; (ii) an interest-generating unit programmed to generate interest-parameters in response to the sensed signals; (iii) an emotion-generating unit programmed to generate emotion-parameters in response to the sensed signals; and (iv) an actuating unit for actuating the device. The device collects information based on its interest and modifies its behavior when the device observes the same object as previously, based on variations of emotions generated when the device observed the object in the past.

9 Claims, 12 Drawing Sheets

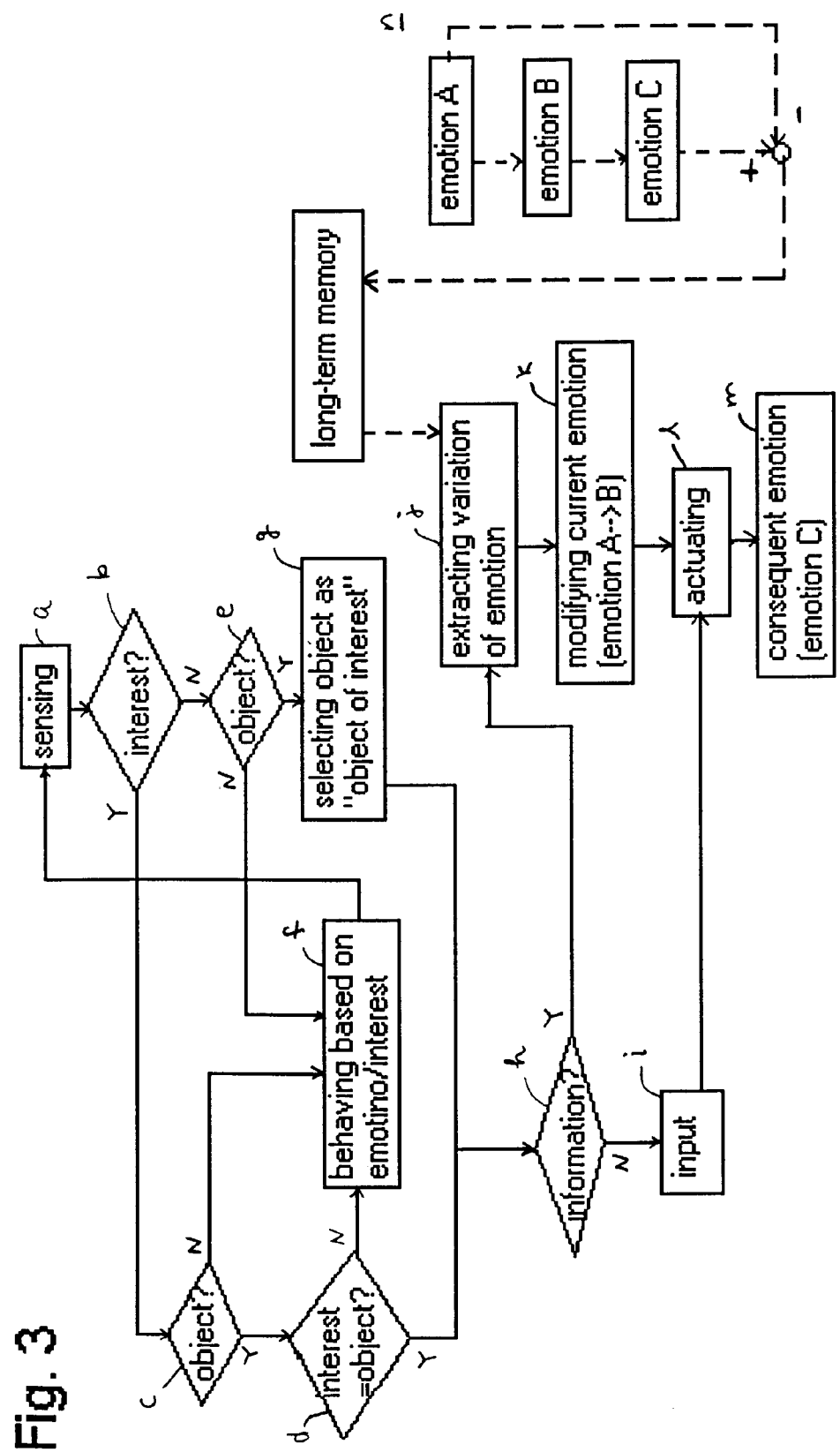

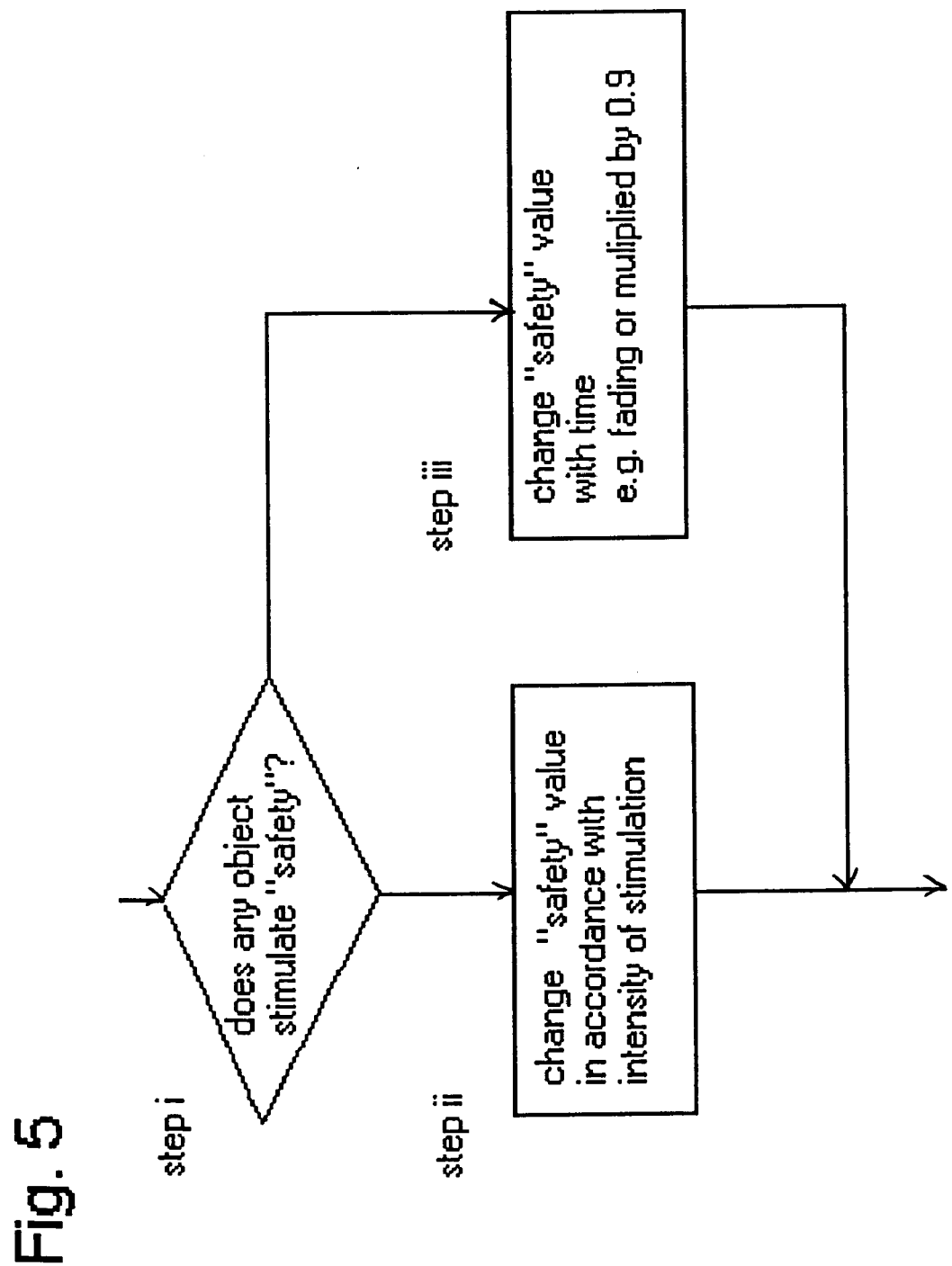

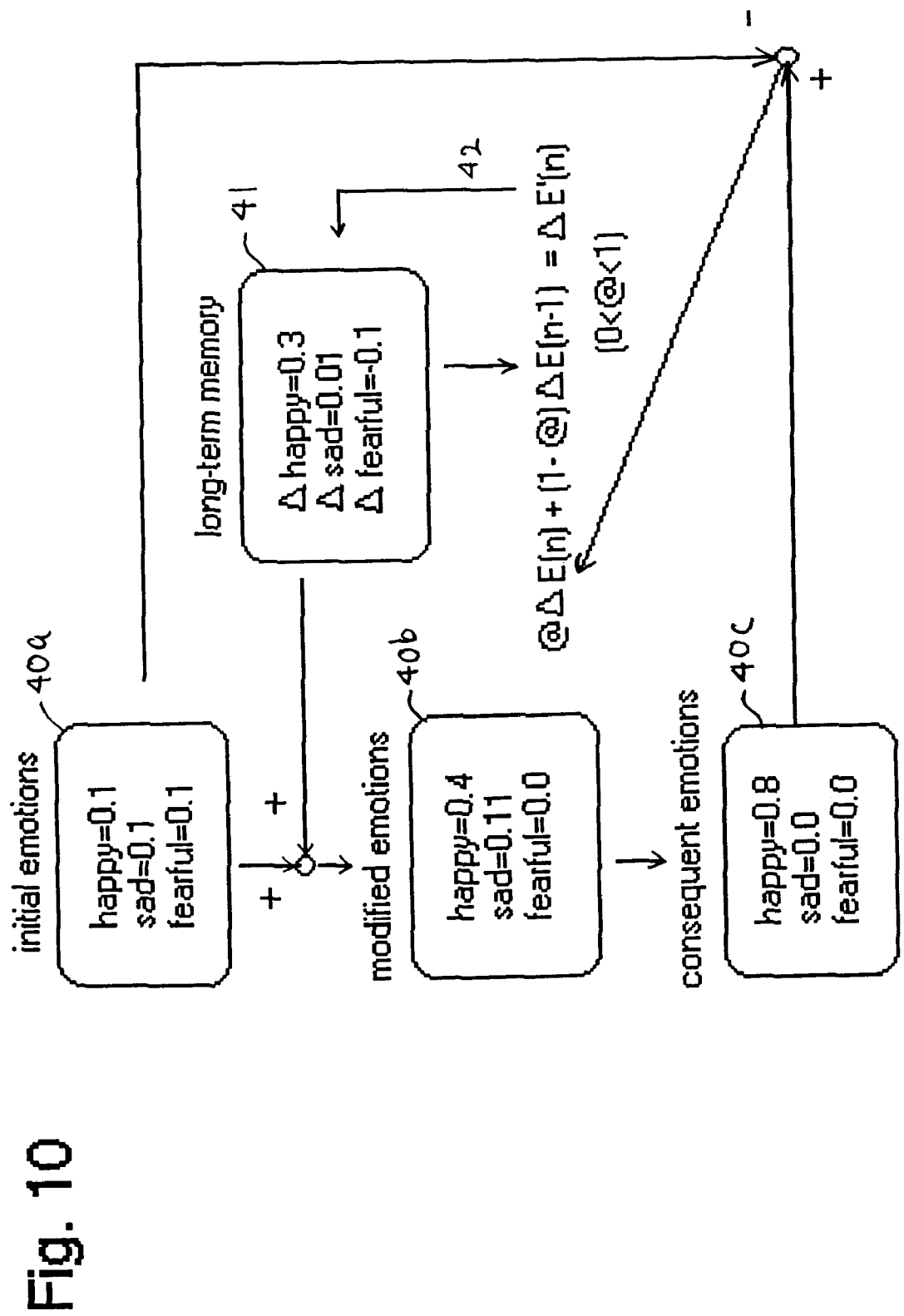

INTERACTIVE ARTIFICIAL INTELLIGENCE

BACKGROUND OF THE INVENTION

1. Field of the Invention

The present invention relates to a method for adjusting behavior of a device, and particularly to a method for adjusting the behavior based on the device's experience.

2. Description of the Related Art

Conventionally, various controlling methods have been available for controlling a device in accordance with a user's demand.

In such controlling methods, normally, the user sets a target value at output which the user wants, and the device is controlled in such a way that the output matches the target value, while feeding the output back to a control system which compares the feedback and the target value to adjust the output. In the above, by feeding the output back to the system to adjust the output, the output of the device to be controlled can approach the target value, thereby achieving control satisfying the user's preference.

However, the above control system may not be appropriate in an area where the user can develop emotions such as companionship toward a device. Such a device includes toys, games, communication tools, search tools, and other tools and devices subjected to personal use. Further, if a target value is not determinable due to the system's complexity or lack of information, the conventional control system does not work.

Furthermore, if a device senses numerous pieces of information, it is difficult to sort them out and use them as useful information to act thereon. If the device is operated solely in accordance with the user's command, the above may not be a problem. However, for an autonomic device which acts without the user's command, it is important to obtain meaningful information.

SUMMARY OF THE INVENTION

A general objective of the present invention is to provide a control system which enables a device to autonomously modify its behavior or performance through interaction with its external environment, i.e., based on its experience. That is a self-development system. The control system can generate pseudo-emotions which are used as a parameter for controlling behavior. The control system can collect information on an object of its own interest, and can store the information and update it by itself. This autonomous behavior system is advantageous, especially when applied to robots, toys, or games. The present invention has exploited a real-time basis behavior-adjusting system.

An embodiment of the present invention is a method for adjusting behavior of a device based on the device's experience. The device comprises: (i) a sensing unit for sensing signals; (ii) an interest-generating unit programmed to generate interest-parameters; (iii) an emotion-generating unit programmed to generate emotion-parameters; and (iv) an actuating unit for actuating the device. The above method comprises the steps of: (a) selecting an object (S) of interest based on interest-parameters ($I_j$) programmed into the device, wherein $S=f(I_j)$, said device having emotion-parameters ($E_i$); (b) upon sensing the object, extracting information, if any, on variations of emotions ($\Delta E_{i-1}$) from a memory under at least the index of the object, said memory storing under the index of the object, information on variations of emotions ($\Delta E_{i-1}$) previously generated by the device through past interaction with the object; (c) modifying the initial emotions ($E_i$) of the device with the variations of emotions ($\Delta E_{i-1}$); (d) actuating the device based on the modified emotions ($E_i + \Delta E_{i-1}$); and (e) inputting in the memory, under the index of the object, variations of emotions ($\Delta E_i$) generated by the device during interaction with the object, thereby updating the memory. Accordingly, when the device observes the same object, the device can modify or improve its behavior based on the information obtained in the past.

In the above, in an embodiment, the updated memory stores variations of emotions ($\Delta E'_i$) under the index of the object, wherein $\Delta E'_i = \alpha \Delta E_i + (1-\alpha) \Delta E_{i-1}$ ($0<\alpha<1$). Accordingly, the memory needs one column for one object and can reduce its capacity. Further, the influence of new experience can be controlled to moderate the behavior changes.

In an embodiment, in step (b), if no information on the object is stored in the memory, steps (d) and (e) can be performed by regarding $\Delta E_{i-1}$ as zero. Further, in step (a), if no object of interest is selected because there is no record, an object sensed by the sensing unit can be selected as an object of interest. Accordingly, the device can learn various objects' characteristics and can improve its behavior.

In another embodiment, the interest-generating unit comprises a plurality of interest modules, each differently programmed to generate and output the interest-parameter, and an object of interest (S) is selected based on the interest-parameter (max $I_j$) which has been assigned the highest score at the time the object is selected ($S=f(\max I_j)$).

Preferably, the control system further comprises a working memory which temporarily pools and stores information from the sensing unit, the interest-generating unit, the emotion-generating unit, in the first-mentioned memory until the device completes its action, and which outputs information to the interest-generating unit, the actuating unit, and the first-mentioned memory. Accordingly, processing becomes efficient.

The interest-parameters and the emotion-parameters can have any labels and definitions. For example, the interest-parameters can represent "safety", "affection", "hunger", and "play", respectively, and the emotion-parameters can represent "happy", "angry", "surprised", "sad", "fearful", and "disgust", respectively. The definition of each label can be predetermined. The number of interest-parameters and the number of emotion-parameters are not limited. The larger the number of parameters, the more complex the behavior becomes. If an object-oriented language program, such as JAVA and C++, is used for parameter control, new labels can be automatically created, so that new behavior can be generated accordingly.

A device controlled by the above control system can behave autonomously and improve behavior based on its experience.

The present invention can be applied to a method as well as an apparatus. Further, the system need not be an integrated system, but can be composed of plural separate units. That is, by networking plural devices or by using a separable medium (CD or IC card), an individual device can be downsized without losing memory and programming capacities.

DETAILED DESCRIPTION OF THE PREFERRED EMBODIMENT

The control system for controlling a device using emotion-parameters of the present invention (referred to as "control system") will be explained with reference to embodiments indicated in the figures.

Basic Control System

In an embodiment of the present invention, an agent or device comprises: (i) an external/internal condition recognition unit, (ii) a interest-generating unit, (iii) an emotion-generating unit, (iv) a long-term memory, (v) a working memory, (vi) a behavior planning unit, and (vii) an actuating unit. The above is a conceptual or functional structure, and need not be a physical structure; that is, these units need not be separately provided, but can be integrated. Further, each unit can be disposed in a device, but can also be disposed separately from the device.

Figure 1:
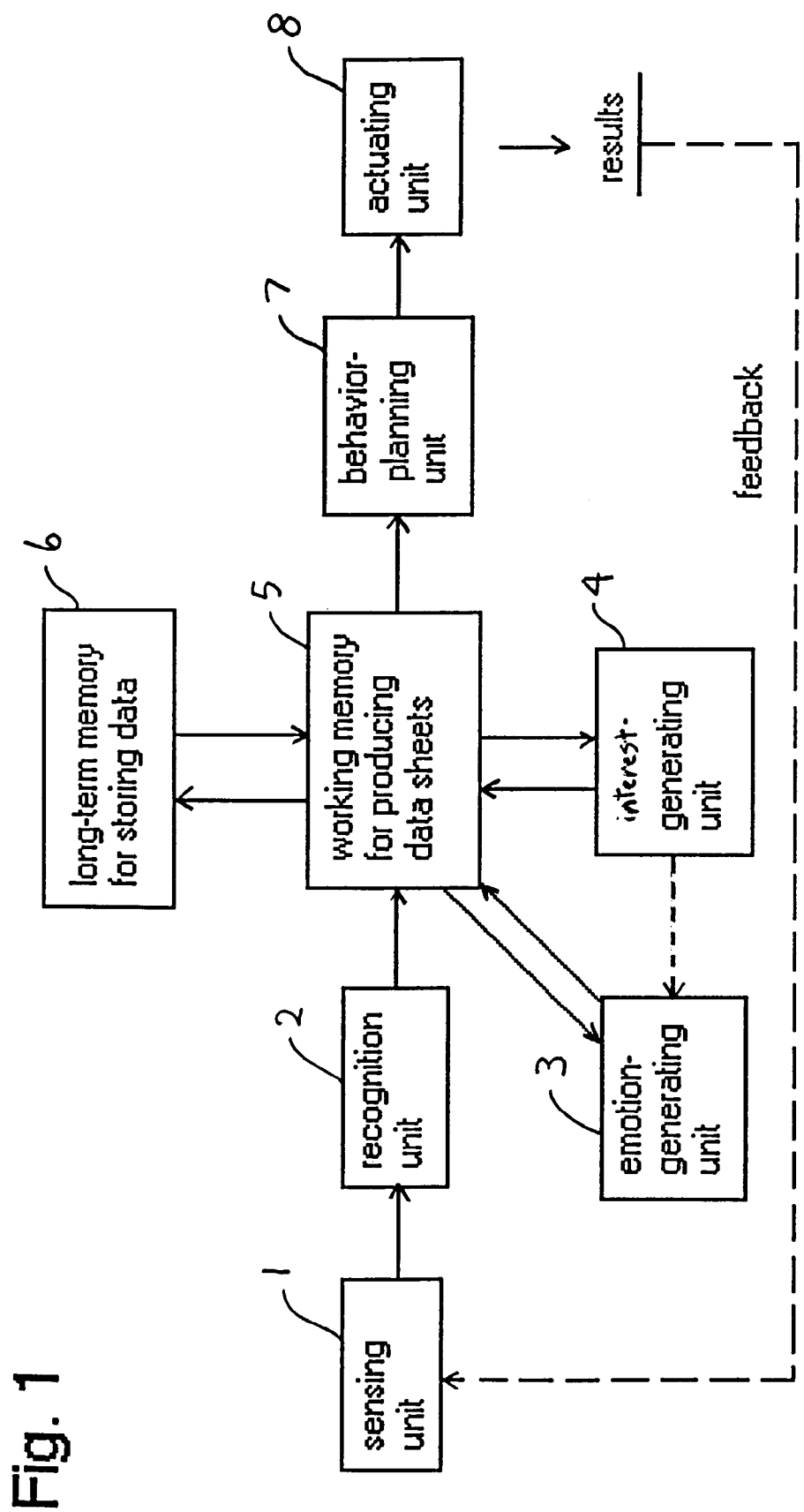
FIG. 1 is a diagram showing an embodiment of the entire control system according to the present invention.

FIG. 1 is a diagram showing an embodiment of the entire control system according to the present invention. As described above, this is a conceptual or functional structure, but not a physical structure.

In the embodiment of FIG. 1, an autonomic device comprises a sensing unit 1, a recognition unit 2, an emotion-generating unit 3, an interest-generating unit 4, a working memory 5 for producing data sheets, a long-term memory 6 for storing data, a behavior planning unit 7, and an actuating unit 8. The sensing unit 1 senses various signals including external and internal information. External information includes visual, tactile, auditory information, and electrically transmitted signals, and internal information includes battery level and malfunction signals. The sensed signals are inputted into the recognition unit 2 which analyzes the signals to generate meaningful information which includes characterization and identification of an object. This recognized information is inputted into the working memory 5 for producing data sheets. The interest-generating unit 4 is programmed to generate interest-parameters in response to the recognized information. The interest-parameters are not limited and may include "safety", "affection", "hunger", "study", and "play". The recognized information need not be all information but at least a piece of information (pre-selected) recognized at the recognition unit 2. Each interest-parameter is regulated independently of or harmoniously with each other. Each interest-parameter may include a time factor; that is, the value of each interest-parameter changes with time (some of them fade with time while others increase with time). Further, each interest-parameter may have its own predetermined function and fluctuate accordingly. The interest-generating unit 4 receives a signal from the working memory 5, which signal indicates whether or not the interest at issue is satisfied. The interest-generating unit 4 outputs a signal of interest to the working memory 5 for producing data sheets. The emotion-generating unit 3 is programmed to generate emotion-parameters in response to the recognized information. This recognized information need not be all but part of the information (pre-selected) recognized at the recognition unit 2, and may be different from that used at the interest-generating unit 4. The emotion-parameters are not limited but may include "happy", "angry", "surprised", "sad", "fearful", and "disgust". Each emotion-parameter is regulated independently of or harmoniously with each other. Each emotion-parameter may include a time factor; that is, the value of each emotion-parameter changes with time (some of them fade with time while others increase with time). Further, the emotion-parameters are generated when receiving the recognized information from the recognition unit 2 and signals from the interest-generating unit 4. The emotion-generating unit 3 outputs signals of emotions to the working memory 5 for producing data sheets. The long-term memory 6 is for storing data when the working memory 5 produces a final data sheet and inputs it to the long-term memory 6. The final data sheets are pooled and rearranged under the index of the object in the long-term memory 6 so that data can be retrieved as necessary. The data from the working memory 5 updates the long-term memory 6. In an embodiment, the working memory 5 can be omitted, and the long-term memory 6 can also function as the working memory 5, or vise versa. In another embodiment, the working memory 5 can be omitted, and each of the emotion-generating unit 3 and the interest-generating unit 4 can include a memory and can be connected to each other and to the other units.

As described above, the working memory 5 receives signals from the recognition unit 2, the emotion-generating unit 3, the interest-generating unit 4, and the long-term memory 6 to produce data sheets (algorithms will be explained later). In the working memory 5, a data sheet may indicate an object, which is being observed, a current interest, which is generated by the interest-generating unit 4, current emotions, which are generated by the emotion-generating unit 3, variations of emotions when previously encountering the object, which are extracted from the long-term memory 6, and a current situation surrounding the device, which is recognized by the recognition unit 2. Based on these data, the behavior planning unit 7 decides on a pattern of behavior and outputs a signal to the actuating unit 8. At the behavior planning unit 7, a behavior pattern may be selected based on emotions which are obtained by adding the variations of emotions to the current emotions, for example; that is, behavior is modified based on the variations of emotion previously generated. Patterns of behavior are not limited but may include "approach", "attack", "avoid", "explore", and "random". If the device has various movable parts such as a tail, ears, hands, and eyebrows, various patterns of behavior can be formed.

Upon action by the actuating unit 8, the result is sensed by the sensing unit 1; that is, the result is fed back to the device. For example, as a result of approaching the object, if the device was hit, that impact is sensed by the sensing unit 1 and inputted into the working memory 5 via the recognition unit 2 where the impact is converted to variations of emotions. The data sheet for this event in the working memory 5 is complete upon inputting the variations of emotions. This data sheet is provided to the long-term memory 6 and updates the data therein. After one data sheet is complete (one event is over) and stored in the long-term memory 6, the device proceeds to a new event.

Basic Data Flow

Figure 2:
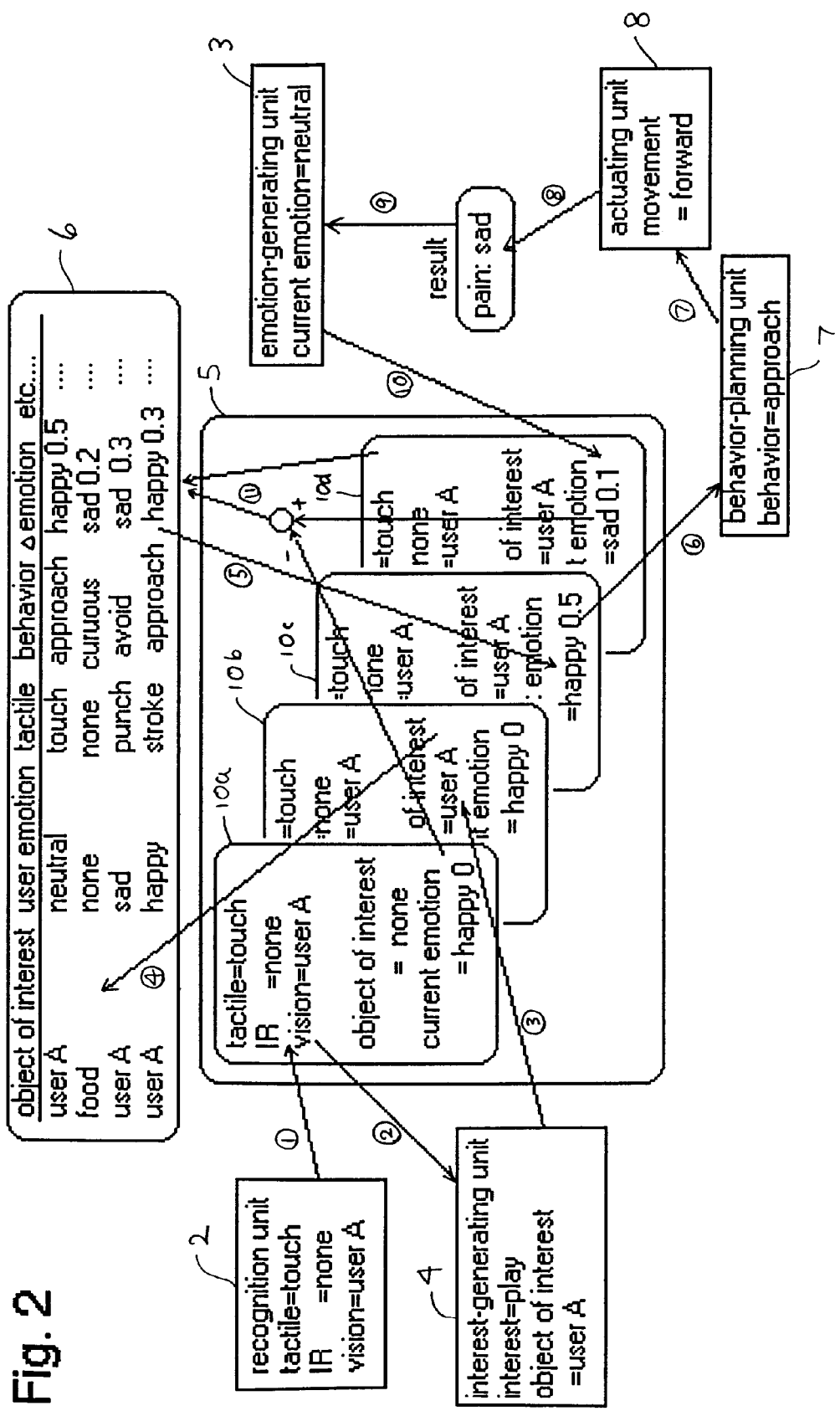
FIG. 2 is a schematic diagram showing data flow and processing flow of an embodiment according to the present invention.

FIG. 2 is a schematic diagram showing data flow and processing flow of an embodiment according to the present invention. In this figure, first, the external/internal environment recognition unit (recognition unit) 2 outputs information (e.g., CONTACT=TOUCH; IR (infrared sensor)= NONE; VISION=USER A) to the working memory 5 which writes the information on a data sheet 10a. The information is derived from the sensing unit 1 and shows that the device is being touched, there is no obstacle in front of the device, and the device is seeing user A. The data sheet 10a includes items "CONTACT", "IR", "VISION", "OBJECT OF INTEREST", and "CURRENT EMOTION". These items are simply an example and can be selected depending on the types of sensors and recognition systems. In the data sheet 10a, "CONTACT", "IR", and "VISION" are updated using the information (current status) from the recognition unit 2.

Second, the current status is inputted into the interest-generating unit 4. The interest-generating unit 4 is programmed to generate interest-parameters (explained later), and here, "play" has the highest intensity among the interest-parameters (e.g., "play", "safety", "hungry", etc.). The relationship between "play" and "user" is predetermined. The "user" can be defined by motion, color, and voice, or simply by an electronic name tag. Here, the interest-generating unit 4 selects "play" and based on the predetermined relationship, user A is selected as an object of interest.

Third, the interest-generating unit 4 outputs the information (OBJECT OF INTEREST=USER A) to the working memory 5 which updates "OBJECT OF INTEREST" (data sheet 10b). The data sheet 10b and the data sheet 10a are the same, but simply for the purpose of showing changes with time or by step, the data sheet 10b is separately indicated (data sheets 10c and 10d are separately indicated for the same reason).

Fourth, the information (OBJECT OF INTEREST=USER A) is inputted to the long-term memory 6. The long-term memory 6 has a spreadsheet wherein data are stored under the indexes of objects. Various data storage systems can be adapted in the long-term memory. Here, the memory stores data after every event. From the long-term memory 6, data stored under the index of user A are extracted. Extraction can be conducted in various ways. If the data sheet includes more information or items, data can be extracted under plural indices. For example, data can be collected under indices of "USER A", "TOUCH", and "APPROACH". Here, a single index, "USER A", is used. Under the index of "USER A", variations of emotions are totaled. Each emotion-parameter can be added separately from the other emotion-parameters. In this figure, however, for simplifying explanation, a single scale is used; that is, "HAPPY" is plus and "SAD" is minus. For example, as a result of collecting data under the index of "USER A", if variations of emotions are "HAPPY" 0.5, "HAPPY" 0.3, and "SAD" 0.3 (i.e., −0.3), the total value of variations of emotions is "HAPPY" +0.5.

Fifth, the information (CURRENT EMOTION=+0.5) is inputted into the working memory 5 which updates "CURRENT EMOTION" under predetermined rules (data sheet 10c). Here, the current emotion was initially "NEUTRAL" ("HAPPY" 0 (zero)). Adding "HAPPY" +0.5 to "NEUTRAL" results in "HAPPY" 0.5. There are various ways to determine "CURRENT EMOTIONS" other than addition. The initial current emotion may have a time factor, i.e., changing with time (usually fading with time).

Sixth, the behavior-planning unit 7 receives the information of the data sheet 10c from the working memory 5. Here, the information indicates that the device is being touched, there is no obstacle in front of the device, the device is seeing user A, and the emotion level (happy) increases by 0.5. The behavior-planning unit 7 is programmed to determine a pattern of behavior based on these pieces of information. Here, the behavior-planning unit 7 selects "APPROACH" based on the situation that the emotion level increases by 0.5, and the direction is toward user A. The approaching speed may be dependent on the emotion level (e.g., the higher the level, the higher the speed becomes).

Seventh, the behavior-planning unit 7 outputs the information (BEHAVIOR=APPROACH, etc.) to the actuating unit 8. The actuating unit 8 receives information from the behavior-planning unit 7 or directly from the working memory 5, so that the actuating unit 8 can determine the direction of movement to achieve the task (APPROACH to USER A). Here, the actuating unit 8 determines "FORWARD". As a result, the device further approaches user A while user A is touching the device.

Eighth, the device receives a consequence of the action. Here, user A hits the device because the device approaches too closely at high speed.

Ninth, as a result, the recognition unit 2 recognizes user A's reaction as "PAINFUL" (this processing flow is not shown), and the emotion-generating unit 3 determines the emotion level as "HAPPY" −0.1" ("SAD 0.1"). The emotion-generating unit 3 is programmed to generate emotion-parameters. There are various ways to determine "CURRENT EMOTIONS" other than addition (explained later).

Tenth, the emotion-generating unit 3 outputs the information (CURRENT EMOTION=SAD 0.1) to the working memory 5 which updates "CURRENT EMOTION" (data sheet 10d).

Eleventh, the difference between the initial emotion level (CURRENT EMOTION=NEUTRAL 0) and the updated emotion level (CURRENT EMOTION=SAD 0.1) is calculated ((SAD 0.1)−(NEUTRAL 0)=(SAD 0.1), i.e., "ΔEMOTION=−.1"), and the information including other data on the data sheet 10d ("CONTACT=TOUCH", "IR= NONE", "VISION=USER A", "OBJECT OF INTEREST= USER A", "ΔEMOTION=−0.1", etc.) is transmitted to the long-term memory 6 and stored as new data under the index of "USER A". There are various ways to store the new data in the long-term memory 6 (explained later).

As a result of updating the long-term memory 6, the device will behave differently than it did previously. For example, if "ΔEMOTION" is retrieved from the long-term memory 6 under the index of "USER A", when the device recognizes user A, the emotion level changes to a lower level, and the device will approach user A at a low speed or avoid user A. This behavior of the device depends on the manner of updating the data in the long-term memory 6 (explained later). In the above, if "ΔEMOTION" is retrieved from the long-term memory 6 under the indices of not only "OBJECT OF INTEREST" but also "CONTACT" and "IR", more complex behavior patters can be performed. That is, when the device is touched by user A and there is no obstacle, the device will approach user A at a low speed or will not move, depending on the manner of updating the long-term memory 6.

In the figure, many flows are omitted. For example, the interest-generating unit 4 may receive the information (HAPPY=−0.1, etc.) from the working memory 5, so that the "play" level (desire) at the interest-generating unit 4 cannot be satisfied and remains high. Further, the emotion-generating unit 3 may receive the information from the interest-generating unit 4 and the recognition unit 2 in order to generate emotion-parameters.

Basic Flow Chart

Figure 3:
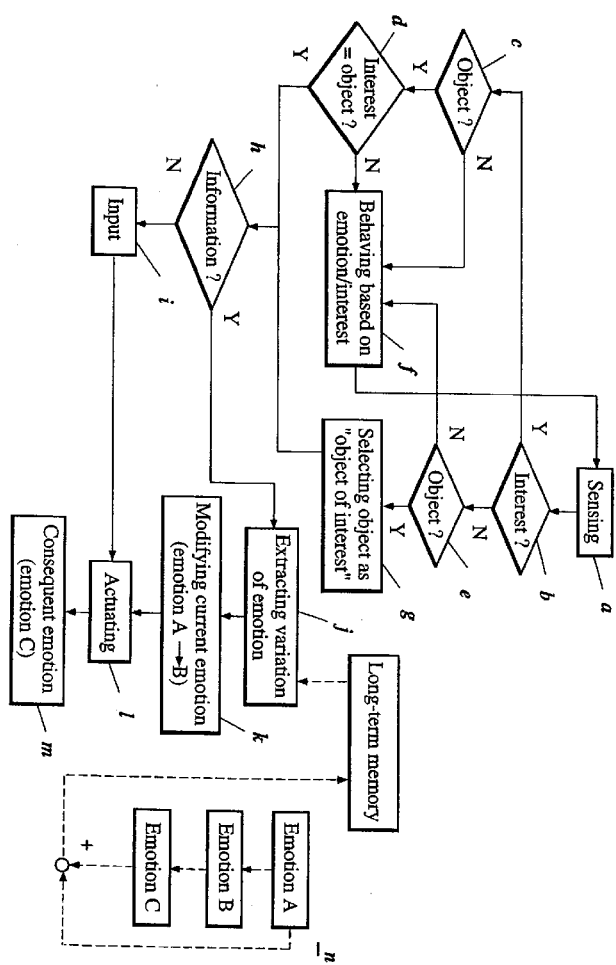
FIG. 3 is a flow chart diagram showing an embodiment of the control system according to the present invention.
Figure 4:
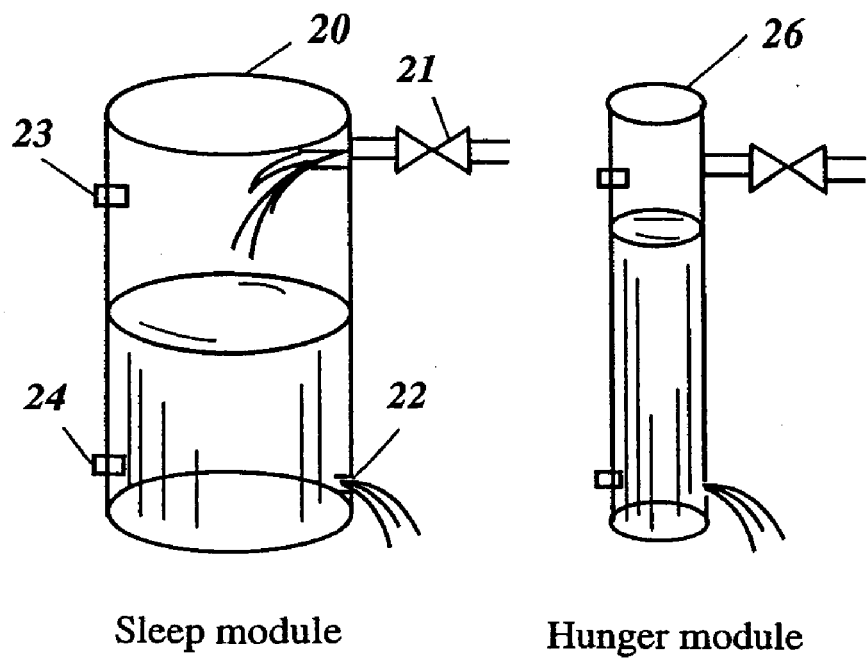

FIG. 3 is a flow chart diagram showing an embodiment of the control system according to the present invention. As shown in FIG. 3, the device senses the environment (step a). The control system checks whether any interest is generated by the interest-generating unit (step b). If there is an interest, the control system checks whether any object is recognized by the device (step c). If an object is recognized, the control system checks whether the object falls in the category of the interest (step d). If the object is within the category of the interest, the control system checks whether the long-term memory has data on the object (step h). If the long-term memory has data on the object, variation of emotion is extracted from the long-term memory (step j). The control system then modifies the current emotion (EMOTION A) to obtain a modified emotion (EMOTION B) based on the extracted variation of emotion (step k). The device is actuated based on the modified emotion (step l). After actuating the device, the control system determines consequent emotion (EMOTION C) (step m). In step i, if the long-term memory does not have data on the object, new data under the index of the object is created and stored in the long-term memory (step i), and the device is actuated (step l). A variation of emotion (EMOTION C−EMOTION A) is calculated and inputted to the long-term memory under: the index of the object (step n). In step b, if there is no significant interest, the control system checks whether any object is recognized by the device (step e). If an object is recognized by the device, the object is selected as "an object of interest" (step g), then step h is activated. In steps c and e, if the device recognizes no object, the device behaves based on its emotion and/or interest (step f), then returning to step a. In step d, if the object is not within the category of the interest, the device behaves based on its emotion and interest (step f), then returning to step a.

The above is simply an example, and the invention is not limited to this example. For example, in step g, the object which the device recognizes need not be selected as an object of interest, and the object can be ignored, and the device continues looking for an object. In step n, a variation of emotion can be calculated by subtracting EMOTION B from EMOTION C. This indicates a change in emotion from the one at the time the device starts interacting with the object, regardless of the initial emotion.

Sensing and Recognition Units

In an embodiment, the device may comprise a CCD camera as a visual detection means, a pressure-sensing sensor and an approach-sensing sensor as touch detection means, a microphone as a hearing-detection means, and an infrared sensor as an obstacle-detection means. The device may further comprise a battery capacity sensor which detects the remaining capacity of the battery. Alternatively, the device may comprise a radio wave signal receiver. By using these sensing means, the device detects objects, the environment, and internal conditions. Further, these sensors allow the device to detect the state of the user, such as a tone of voice, facial expressions, and gestures, and the operational environments where the device is used.

If the device is a robot, the CCD camera is installed on the top of the head and can be set in any direction via a universal joint. For example, the robot can be controlled in such a way that the robot automatically moves toward an object, such as a human or animal, which is a cause or source of information such as changes in temperature and sound. Image information such as facial expressions of the user and surrounding environments is supplied to a controller.

The pressure-sensing sensor may be installed in the lower front of the robot so that when the robot has actual contact with an obstacle, such information is provided to the controller.

The microphone may be installed on the side of the head of the robot, and provides information to the controller upon collecting sound/voices arose around the robot.

In the present invention, the sensed signals, i.e., primitive information, can be used directly, without further processing. For example, if a color is sensed, and if the control system: is designed to work based on the color (an object is recognized simply by the color), no further processing is required. However, if the device is designed to respond to more than the color, the device needs to recognize more complex information and may require processing information. For example, based on the color, movement, and sound, the object can be recognized. Further, if complex recognition systems are used, the user's facial expression can be detected, and the device can respond to the emotions of the user which are represented by the facial changes (Hanaya, et al., "An attempt of individual identification from face photographs", Technical Report of the Institute of Electronics, Information and Communication Engineers, CS96-123, IE96-92 (1996-12), pp. 55–60). A face neuron or neural network technology can be adapted.

In the present invention, for the purpose of simple experimentation, by using a radio wave detection sensor, the device can detect an object which possesses an identification tag transmitting identification information. The radio wave detection sensor can transmit radio waves and receive resonance signals emitted from the identification tag which has a particular resonance circuit. In addition, magnetic identification or bar code identification can be adapted. Further, a neural network can be used for recognizing an object based on the sensed signals.

Interest-Generating Unit

Figure 4:
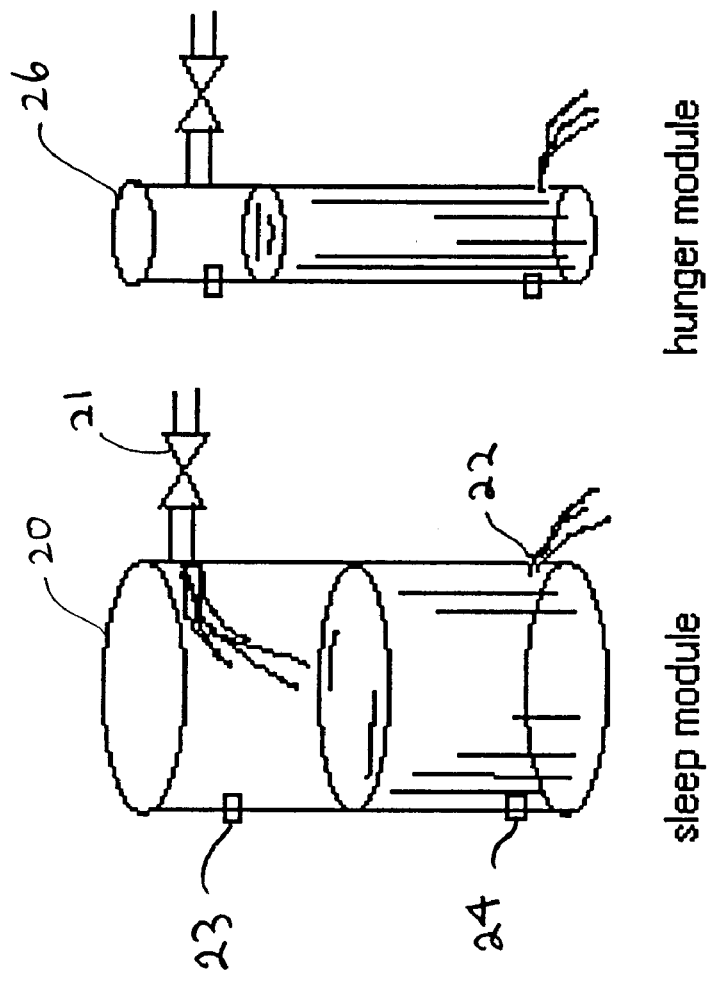
FIG. 4 is a diagram showing an embodiment of the above metaphoric tanks in the present invention.

The interest-generating unit is used for selecting an object of interest, so that the device can behave and collect data efficiently, and can improve its behavior quickly, without information overflow. The device can select an object by itself, without a user's command, so that the device can behave autonomously. The interest-generating unit can be independent from the external conditions or environment, and can be a function of its own equations. However, the interest-generating unit may be affected by the internal conditions such as battery level and the degree of satisfaction of each interest-parameter. Further, the interest-generating unit may have a time factor and change each interest-parameter with time. A change with time may occur in the direction of fading. The functions controlling each interest-parameter can be independent of each other, and they may create fluctuation cycles of each interest-parameter. For example, interest in "play" may fluctuate at predetermined intervals. The working memory may store data showing the number of occurrences of "play" and a degree of satisfaction, so that the interest-generating unit receives the data and modifies each interest-parameter. The working memory shown in FIG. 3 can include the item "capacity" which shows a level or degree of satisfaction, and, for example, when the consequent emotion is positive, the working memory outputs a signal to the interest-generating unit to raise the satisfaction level or degree. Thus, in an embodiment, I=f (t, C) wherein 1 is an interest-parameter, f is a function, t is a time factor, and C is capacity. If each interest-parameter is metaphorically represented by contents in a tank, its satisfaction level can be represented by the level of the contents. FIG. 4 is a diagram showing an embodiment of the above metaphoric tanks. A tank 20 of "sleep" has a small hole 22 at the bottom, so that the contents 25 (interest-parameter) leaks with time. The tank has two level switches; a first switch is a lower switch 24 disposed at a lower part of the tank, which triggers opening a valve 21 to fill the tank with the contents (interest-parameter), and the other switch is a higher switch 23 disposed at a higher part of the tank, which triggers closing the valve 21 to stop filling the tank with the contents (interest-parameter). Even if the tank is full, the contents leak slowly with time, and eventually the lower switch will be activated. While the valve is open, new contents are introduced into the tank every time "sleep" is satisfied. The above mechanism can readily be realized in a program. If there are a plurality of interest-parameters, a plurality of tanks as above can be used, and the filling speed, the leaking speed, the positions of the lower switch and the higher switch can vary among the tanks (interest-parameters). In FIG. 4, a tank 26 of "hunger" is smaller than the tank 20 of "sleep". As described above, the interest-generating unit can readily be preprogrammed.

Figure 5:
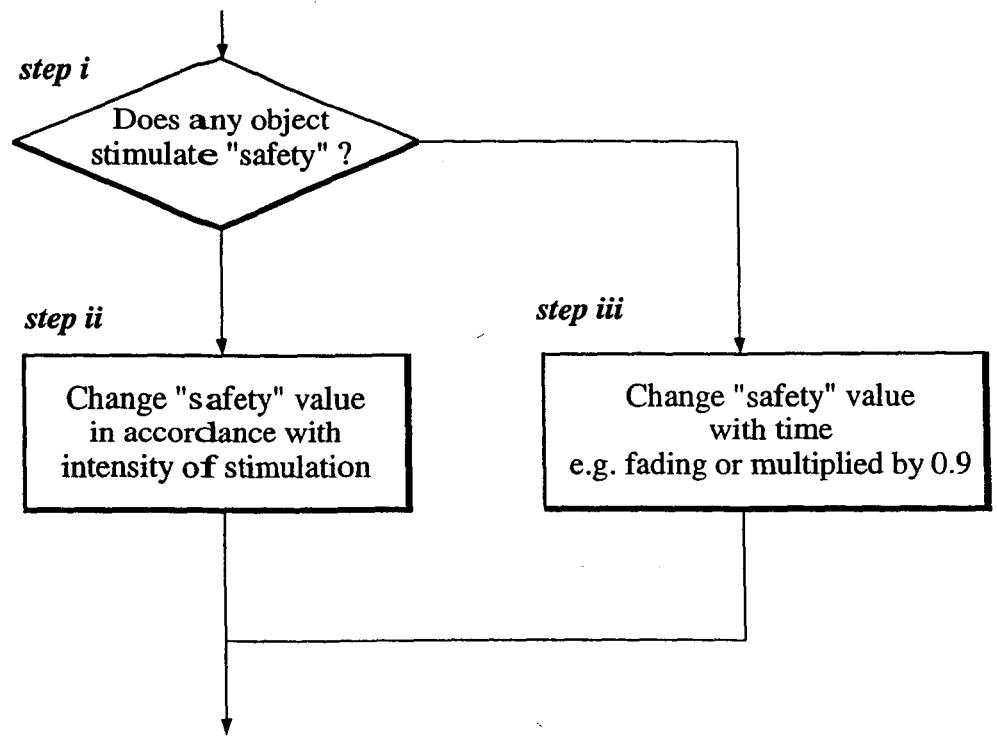
FIG. 5 is a diagram showing an embodiment of a flow chart showing time management flow in the present invention.
Figure 6:
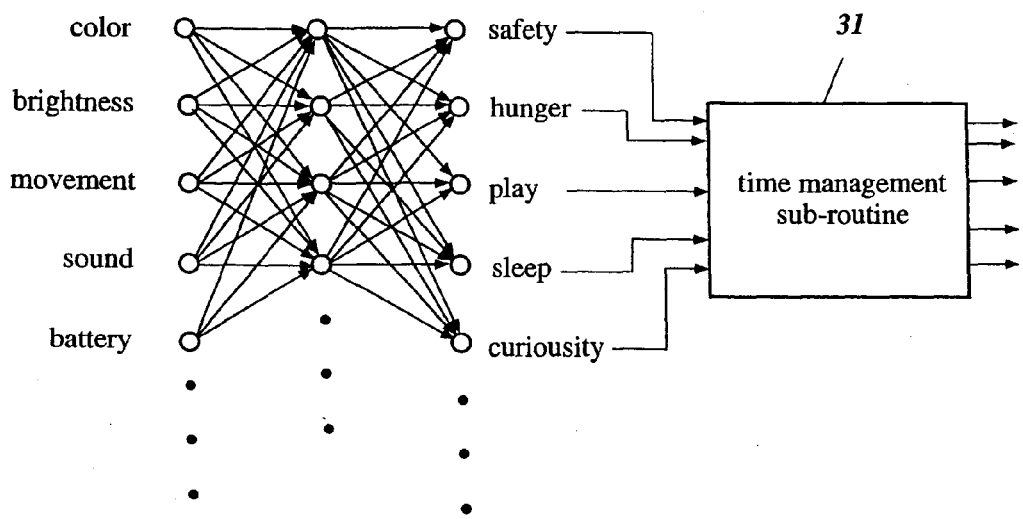
Figure 7:
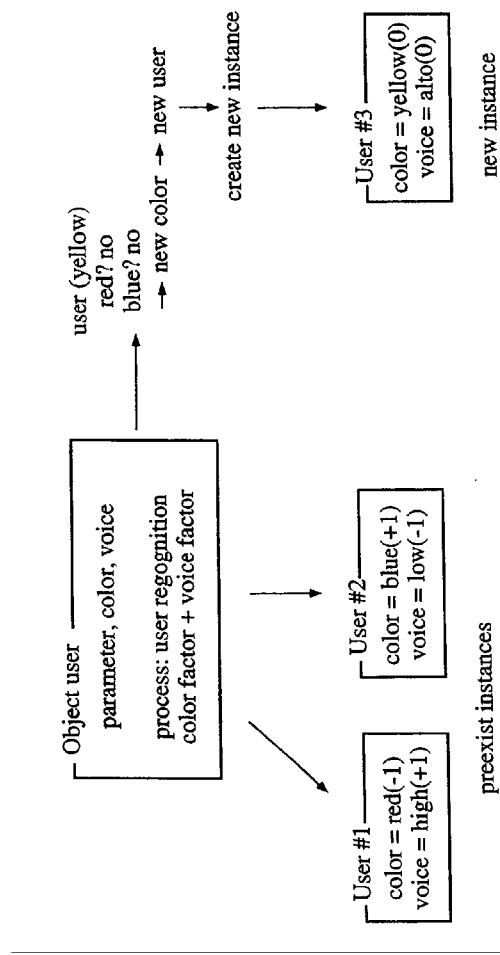
Figure 8:
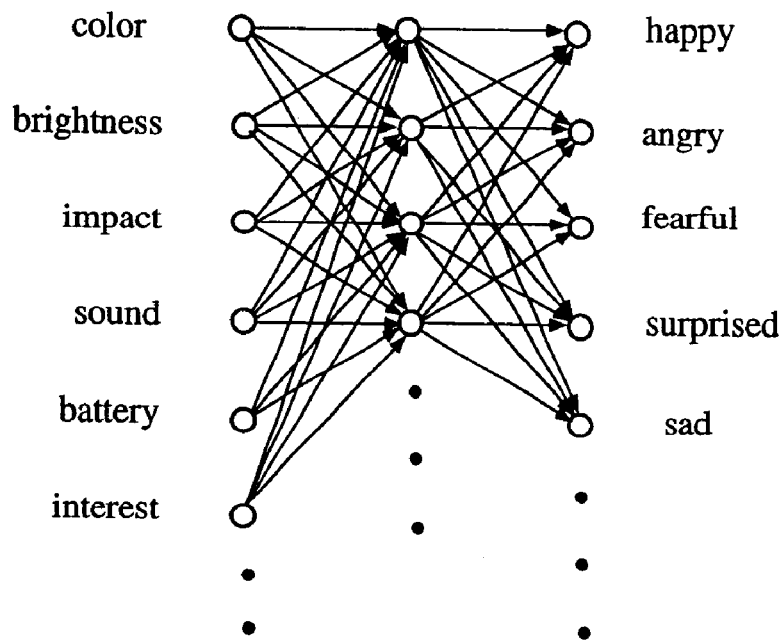
Figure 9:
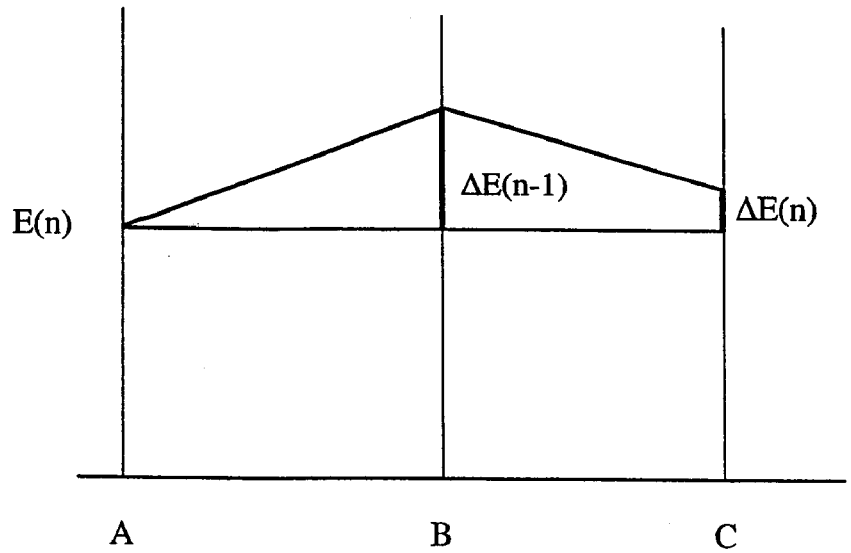

In another embodiment, changes with time can be achieved as shown in FIG. 5 which is a flow chart showing time management flow. In FIG. 5, if there is any signal stimulating "safety" (step i), the value of the interest-parameter is modified in accordance with the intensity of the stimulation (step ii). If there is no signal stimulating "safety" in step i, the value of the interest-parameter is modified under predetermined rules (step iii). In FIG. 5, the value of the interest-parameter is fading or is multiplied by 0.9.

Figure 6:
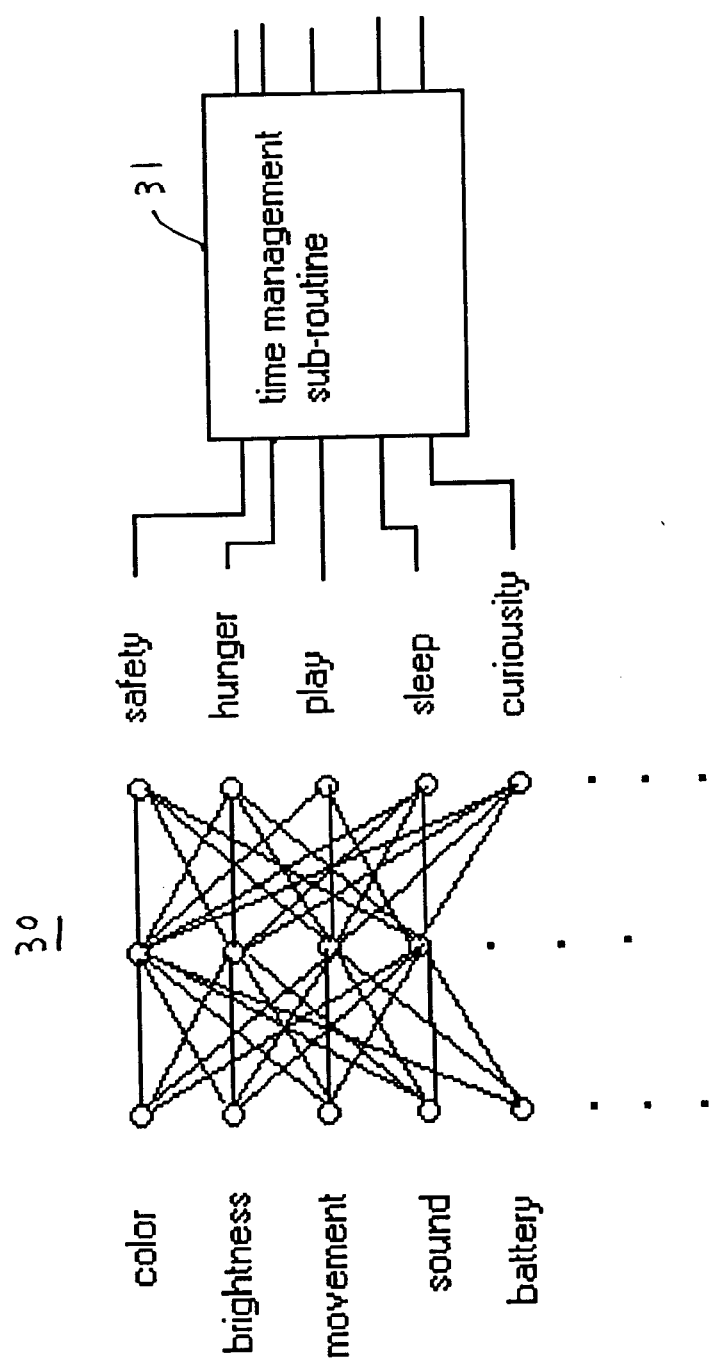
FIG. 6 is a diagram showing an embodiment of a neural network for the interest-generating unit in the present invention.

In another embodiment, the interest-generating unit can be established using a neural network by regulating a relationship between the recognized signals and the interest-parameters. FIG. 6 is a diagram showing an embodiment of a neural network 30 for the interest-generating unit. When using the neural network, each interest-parameter is related to one another. In addition, output of the neural network is connected to a time management sub-routine 31 to change each output with time. The time management can be conducted by activating the time factor (e.g., reducing 10%) at pre-selected time intervals or after every (or pre-selected number) running cycle(s) of a program.

The neural network can be established off-line or on-line. If it is conducted on-line, output of the device is fed back to the control system, and coupling coefficients can be adjusted. Further, coupling coefficients can be modified using evolutionary computing technology such as genetic algorithms and genetic programming. However, if on-line establishment is conducted, a "training" period will be required.

Further, the interest-generating unit can be constituted by a multi-dimensional map defined by the recognized signals and the interest-parameters.

The interest-generating unit may select one interest-parameter which has the lowest value among all of the interest-parameters at the time the interest-generating unit is called for. Selection of an interest-parameter can be conducted in various ways, including selection at random or under predetermined rules or functions.

Object Recognition

When the interest-generating unit generates an interest such as "play", the device can recognize "user A", for example, as an object of interest in various ways. A simple method is to predetermine the relationship between interest-parameters and objects. That is, the interest-generating unit can be programmed to recognize "user A" when "play" is selected as the interest. User A can be defined by color, voice, face configuration, and/or name tag. Similarly, the interest-generating unit can be programmed to recognize "dark" and "quiet" place when "sleep" is selected as the interest. The term "dark" and "quiet" can be relative evaluation, and the device can find a relatively dark and quiet place among the objects the device is observing. The device is directed in, a direction where values indicated by audio sensor and brightness sensor become lower. This relative evaluation can be performed easily. However, in the above, if the interest-generating unit is provided with a predetermined relationship between the interest-parameters and the specific objects, if the device observes a new object, the device cannot respond to it. For example, if "play" and "user A" are specifically related to each other, if the device observes user B, the device may not recognize user B as an object of interest. If the objects are defined by genetic characteristics or loose rules such as a "moving" object making "sound", user A and user B can be an object of interest. After the device recognizes user A and while the device interacts with user A, the device can collect data on identification of user A by using the sensing unit. The data can be stored in the long-term memory and written in the spreadsheet under the index of user #1. Subsequently, when the device observes user #1 inputs data on a data sheet in the working memory, the device extracts data on user #1 from the long-term memory to modify the emotion as explained above. In the above, although the device can extract data on user #1, the interest-generating unit does not differentiate user #1 from other users; that is, user #1 is not and will not be an object of interest. The interest-generating unit recognizes an object of interest which is, for example, "moving" and making "sound".

Figure 7:
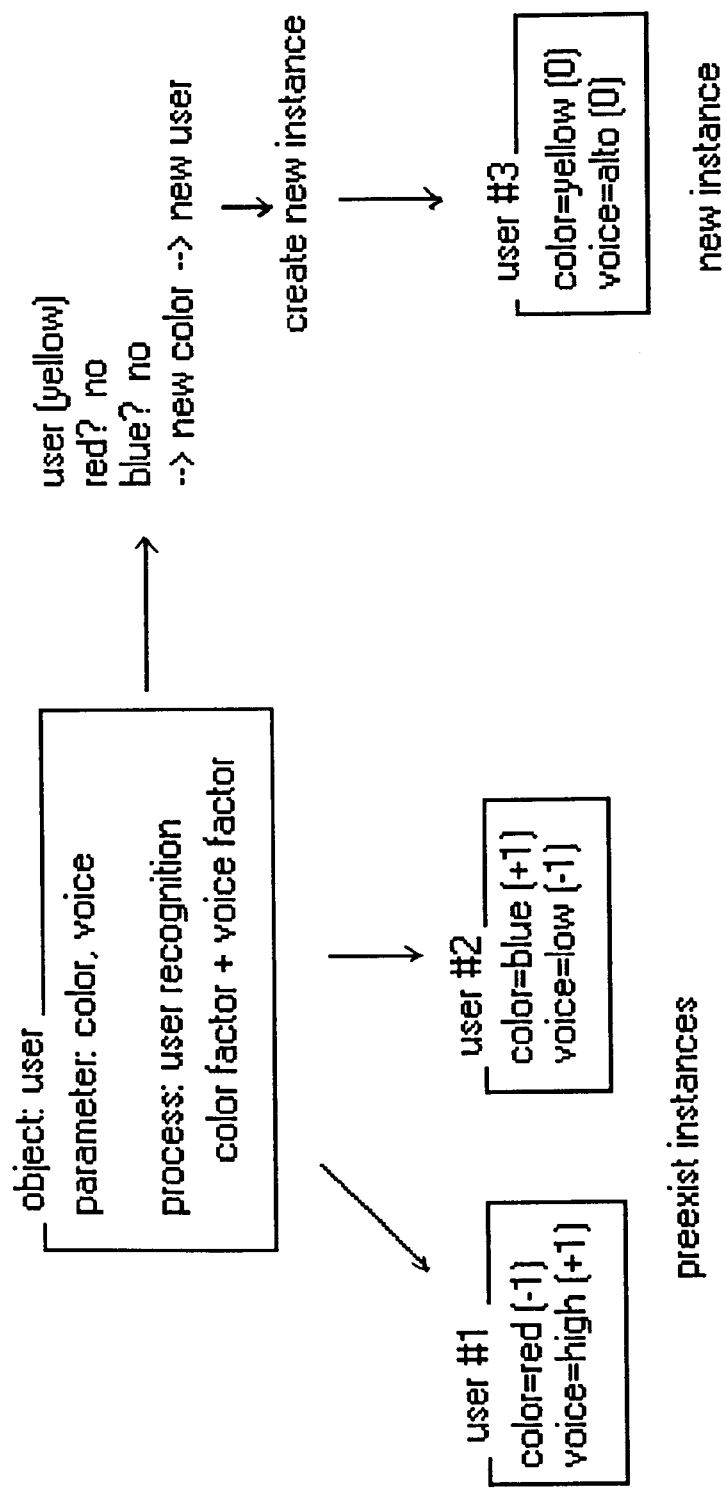
FIG. 7 is a diagram showing an embodiment of schematic processes of JAVA in the present invention.

By using object-oriented languages such as JAVA and C++, the number of objects of interest can be increased autonomously. For example, in JAVA, first, "objects" are defined by "parameters" and "methods", and then, instances are defined based on "parameter" and "method". FIG. 7 is a diagram showing schematic processes of JAVA. In this figure, the "object" is "user", and "user parameters" are "color" and "voice", and "method" is (user parameter x (color + voice)). Here, the program stores two instances; user #1 (color=−1(red), voice=+1(high)), and user #2 (color=+1(blue), voice=−1(low)). When the device observes user #3 (color=0(yellow), voice=0(intermediate)), the program checks whether user #3 falls within the profiles of user #1 or #2. Here, user #3 is neither red (−1) nor blue (+1), indicating that user #3's color is new which is 0 (yellow). The program creates a new instance under the index of user #3 and defines user #3 by color (0, yellow) and voice (0, intermediate). When the device does not observe an object of interest, the device may select an object which the device is seeing, as an object of interest as explained above. User #3 will be one of objects of interest. That is, when the interest-generating unit selects "play", the program checks whether the object the device is seeing is either one of users #1, #2, and #3. By continuing such experiments, the device stores many objects of interest.

Emotion-Generating Unit

Figure 8:
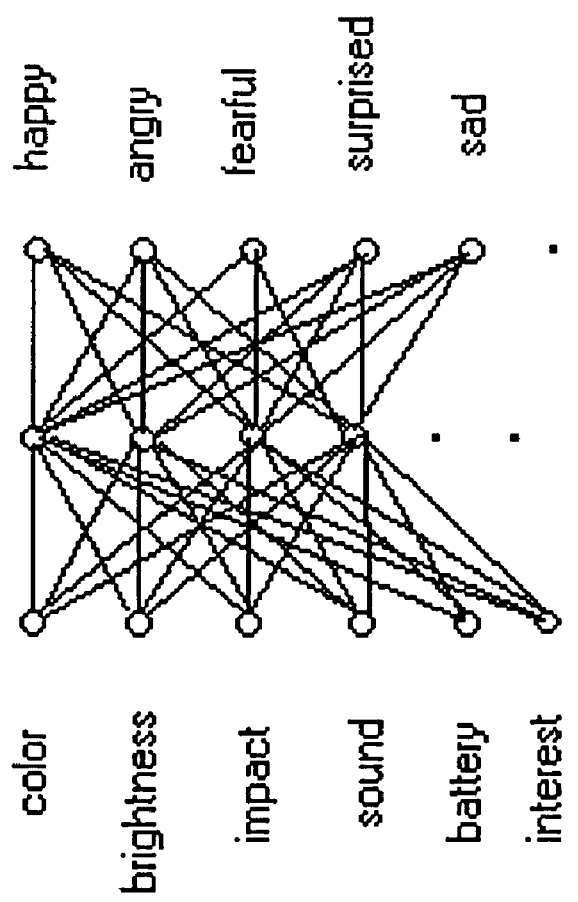
FIG. 8 is a diagram showing an embodiment of an emotion-generating unit using a neural network in the present invention.

The emotion-generating unit can be operated by various ways which include a neural network. FIG. 8 is a diagram showing an embodiment of an emotion-generating unit using a neural network. The structure of the neural network in FIG. 8 is similar to that indicated in FIG. 6. The difference is that this neural network uses signals from the interest-generating unit as one of the inputs. Alternatively, the output from the neural network can be multiplied by signals from the interest-generating unit. The input-output relationship of the neural network may be regulated in advance by off-line training, although the neural network can be established off-line or on-line. If it is conducted on-line, output of the device is fed back to the control system, and coupling coefficients can be adjusted. Further, coupling coefficients can be modified using evolutionary computing technology such as genetic algorithms and genetic programming. However, if on-line establishment is conducted, a "training" period will be required.

For establishing an emotion generation system, the technology disclosed in U.S. patent application Ser. No. 09/059, 278, filed Apr. 13, 1998, by Tamiya, et al., entitled "CONTROL SYSTEM FOR CONTROLLING OBJECT USING PSEUDO-EMOTIONS GENERATED IN THE OBJECT", can be adapted to the present invention. The reference is hereby incorporated herein as reference. In the above, each emotion-parameter is defined by a facial expression which the robot can output, and teacher data are not required to establish the neural network if output evaluation can be conducted by using reward signals (e.g., being caressed) or penalty signals (e.g., being hit), instead of teacher data.

Further, the emotion-generating unit can be constituted by a multi-dimensional map defined by the recognized signals and the emotion-parameters.

For a very simple model, the input-output relationship in the emotion-generating unit can be simplified by directly relating recognized signals with emotions. For example, if the device is "hit", the device is "sad"; if the device is softly "touched", the device is "happy"; if the device is "low in power", the device is "angry"; if the device hears "loud sound", the device is "surprised", etc.

Date Stored in Memory

In the present invention, the device's behavior is modified by variations of emotions when the device encounters the object. The variations of emotions are extracted from the long-term memory. If the device has emotion-parameters ($E_n$) initially; and upon sensing the object, if information on variations of emotions ($\Delta E_{n-1}$) is extracted from a memory under the index of the object, the initial emotions ($E_n$) of the device are modified with the variations of emotions ($\Delta E_{n-1}$). As a result, the device has the modified emotions ($E_n + \Delta E_{n-1}$) when the device is actuated. Variations of emotions ($\Delta E_n$) are generated by the device during interaction with the object, thereby updating the memory. The device has encountered the object (n−1) times before, and this is #n interaction with the object.

Figure 9:
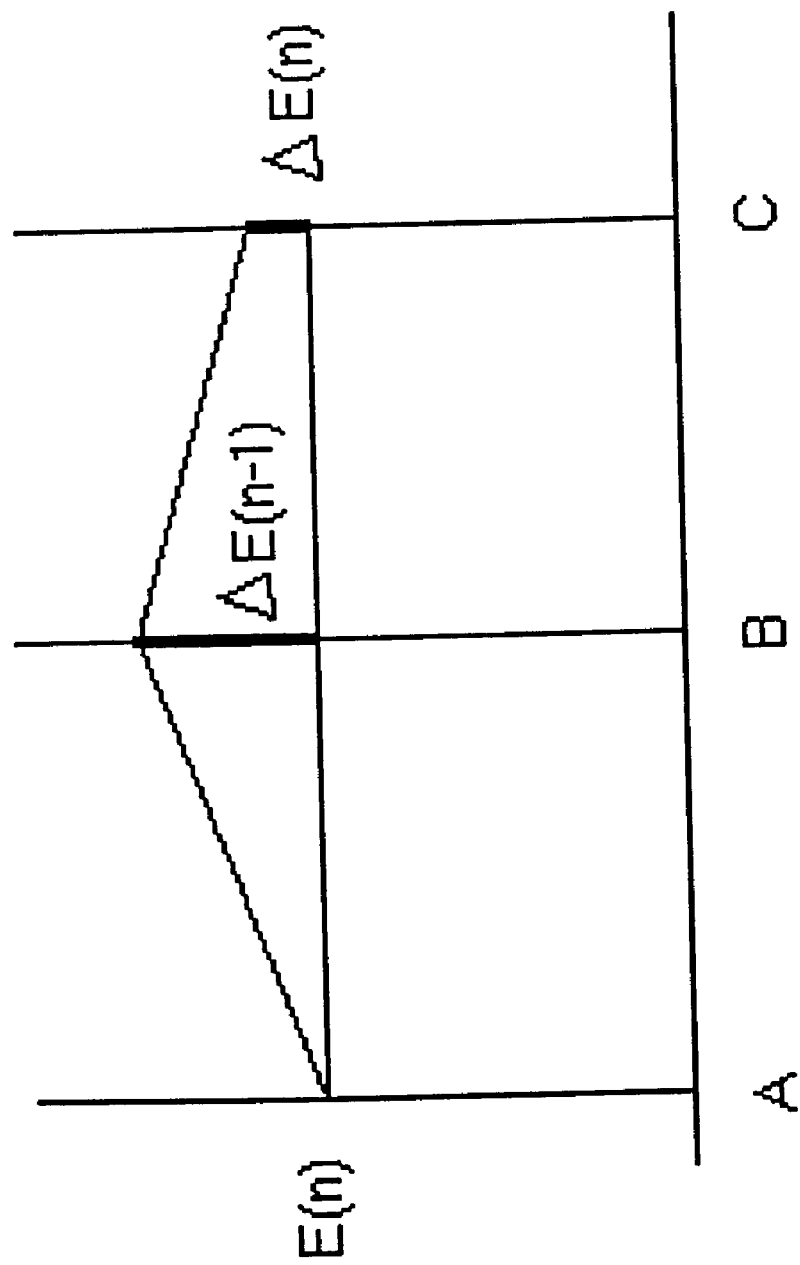
FIG. 9 is a diagram showing an embodiment of changes in emotions in the present invention.

FIG. 9 is a diagram showing an embodiment of changes in emotions. $\Delta E_n$ can be saved in the long-term memory in various ways and when the device next encounters the object (#n+1), the variations of emotions are extracted from the long-term memory in the form of $\Delta E'_n$. If the long-term memory has a plurality of columns for one object and adds a new column for new data, $\Delta E'_n$ can be:

$$\Delta E'_n = \Sigma \Delta E_n / n$$

$$\Delta E'_n = \Sigma (\Delta E_n \times \lambda) / n \text{ ($\lambda$ is a time factor)}$$

$\Delta E'_n$ can be simply the average of $\Delta E_n$ or the average of $\Delta E_n$ multiplied by $\lambda$. $\lambda$ is a coefficient which is a function of n so that the older the memory, the less the contribution becomes. If the long-term memory has one column for one object, $\Delta E'_n$ can be:

$$\Delta E'_n = \Delta E_n$$

$$\Delta E'_n = \alpha \Delta E_n + (1-\alpha) \Delta E_{n-1} \text{ } (0 < \alpha < 1)$$

In the above, the long-term memory does not need to have a large memory capacity because one column is sufficient for one object. The first equation is the same as the second equation when $\alpha=1$. If $\alpha=1$, the precedent data will be abandoned and the data cannot be cumulative. If $\alpha=0.1$–$0.2$, the data in the past can be used and modified effectively based on the current experience. The influence of the current experience is not large, and the device's behavior will change gradually. By changing $\alpha$, the significance of the current experience can be adjusted.

If the tendency of emotion changes is considered to be important, $\Delta E'_n$ can be:

$$\Delta E'_n = \Delta E_n - \Delta E_{n-1}$$

Figure 10:
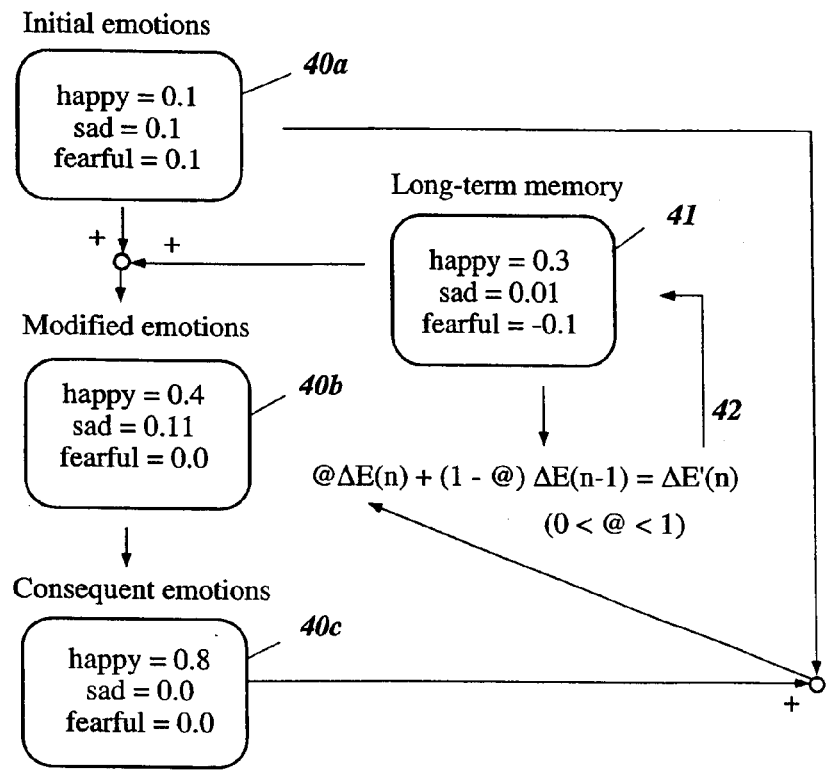
FIG. 10 is a diagram showing an embodiment of data-storing processes under the rule, $\Delta E'_n = \alpha \Delta E_n + (1-\alpha) \Delta E_{n-1}$ ($0 < \alpha < 1$) in the present invention.
Figure 11:
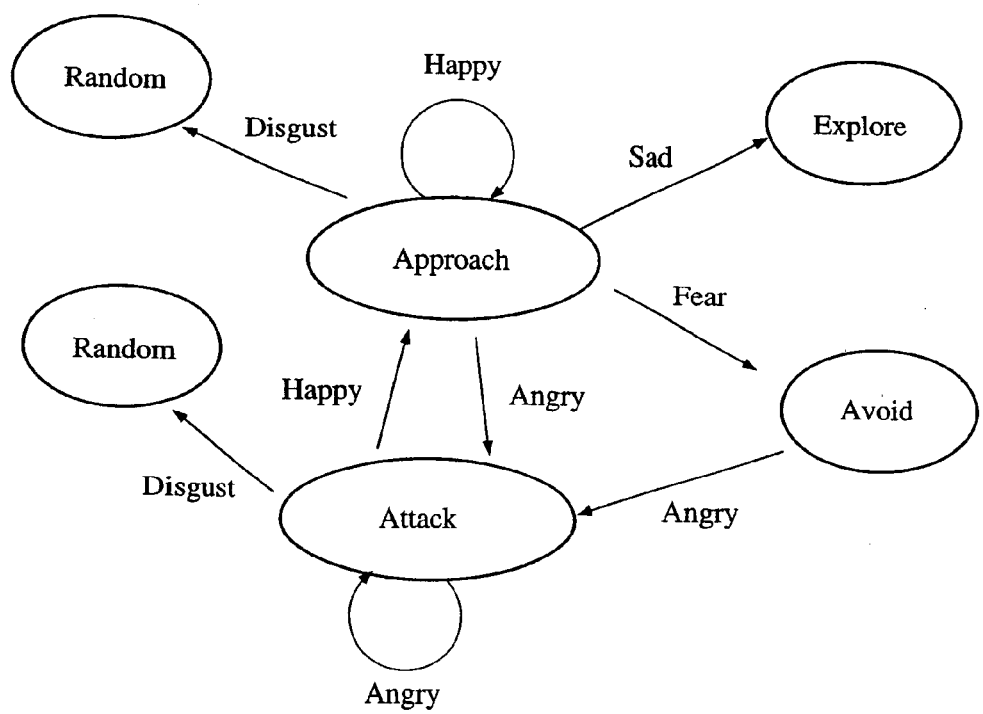
Figure 12:
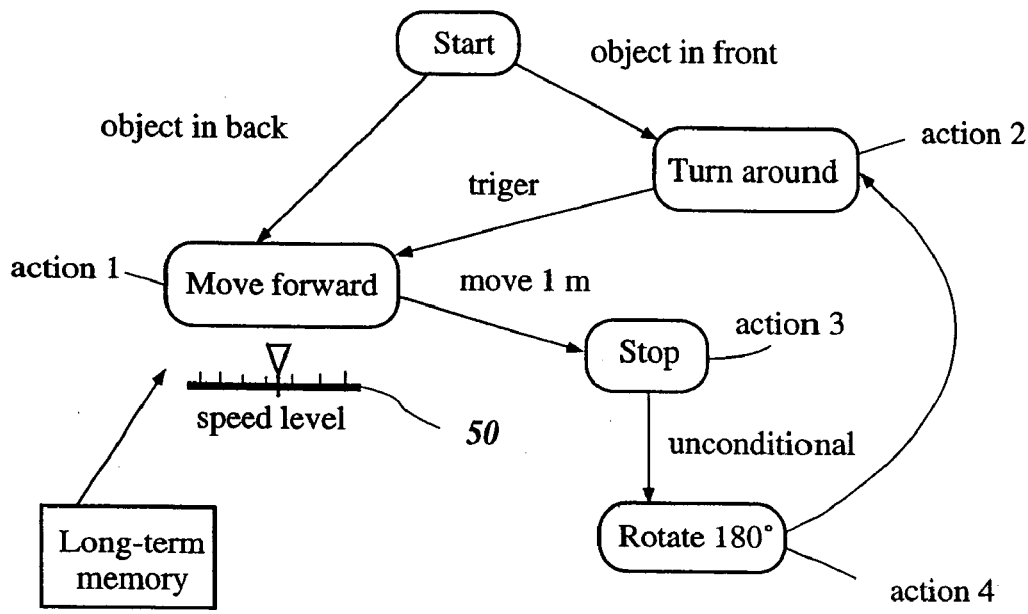

FIG. 10 is a diagram showing an embodiment of data storing processes under the rule, $\Delta E'_n = \alpha \Delta E_n + (1-\alpha) \Delta E_{n-1}$ ($0 < \alpha < 1$). In the figure, the working memory has a data sheet 40a indicating HAPPY 0.1, SAD 0.1, and FEAR 0.1, as initial emotions ($E_n$, wherein $E_n = E_{n1}, E_{n2}, \ldots$). The long-term memory has a spreadsheet 41 indicating HAPPY 0.3, SAD 0.01, and FEAR −0.1, as variations of emotions ($\Delta E_{n-1}$), which update $E_n$ (data sheet 40b). The data sheet 40b indicates HAPPY 0.4, SAD 0.11, and FEAR 0.0, as modified emotions ($E_n + \Delta E_{n-1}$) (The modified emotions need not be simply ($E_n + \Delta E_{n-1}$) but can be a function of $E_n$ and $\Delta E_{n-1}$). Based on the modified emotions, the device is actuated and consequently, variations of emotions occur (data sheet 40c). The data sheet 40c indicates HAPPY 0.8, SAD 0.0, and FEAR 0.0, as consequent emotions ($E_{n'}$). The variations of emotions after actuation of the device are $\Delta E_n$ ($E_{n'} - E_n$). $\Delta E_n$ is HAPPY 0.7, SAD −0.1, and FEAR −0.1. The rule, $\Delta E'_n = \alpha \Delta E_n + (1-\alpha) \Delta E_{n-1}$, is used, wherein $\alpha = 0.1$. Variations of emotions to be saved in the long-term memory ($\Delta E'_n$) are HAPPY 0.34, SAD −0.01, and FEAR −0.1, which update the long-term memory. When the device encounters the object, the emotions will be modified by $\Delta E'_n$.

Behavior-Planning Unit

Figure 11:
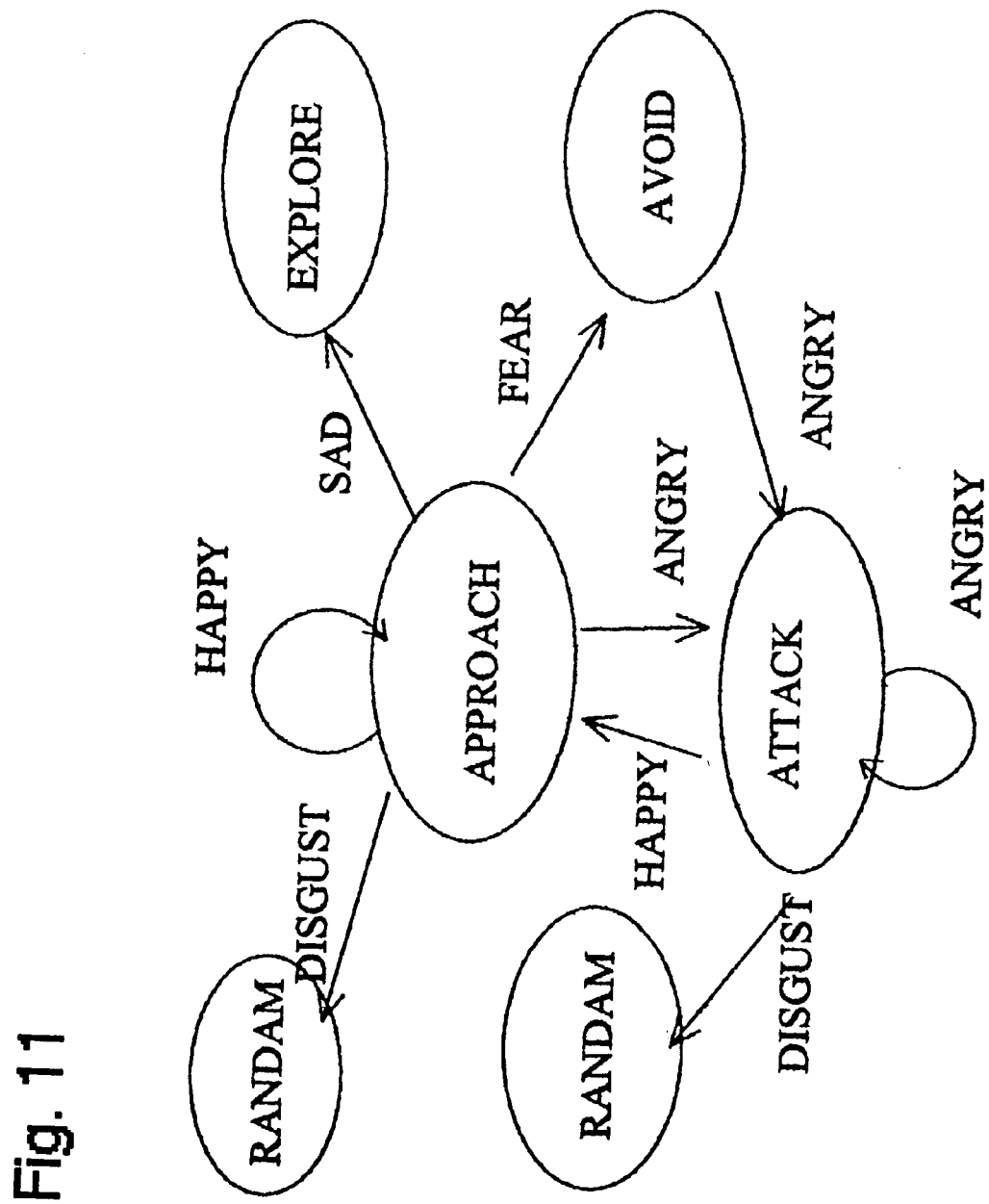
FIG. 11 is a diagram showing an embodiment of behavior patterns in the present invention.

FIG. 11 is a diagram showing an embodiment of behavior patterns. As a result of variations of emotions, the device's behavior is modified in accordance with the variations of emotions. If the initial behavior is "APPROACH", when the device raises an "ANGRY" score, the behavior is changed to "ATTACK"; when the device raises a "FEAR" score, the behavior is changed to "AVOID"; when the device raises a "DISGUST" score, the behavior is changed to "RANDOM"; when the device raises a "SAD" score, the behavior is changed to "EXPLORE"; when the device raises a "HAPPY" score, the behavior is not changed, but may be more active (faster movement). If the initial behavior is "ATTACH", when the device raises a "HAPPY" score, the behavior is changed to "APPROACH"; when the device raises a "DISGUST" score, the behavior is changed to "RANDOM"; and when the device raises an "ANGRY" score, the behavior is not changed, but may be more active (faster movement). When the device avoids the object, the device raises an "ANGRY" score (run away is not successful), the behavior is changed to "ATTACK".

These behavior patterns can be established by a neural network by regulating the input-output relationship or by a multi-dimensional map. Further, coupling coefficients of the neural network can be modified using evolutionary computing technology such as genetic algorithms and genetic programming. However, if on-line establishment is conducted, a "training" period will be required. For establishing behavior patterns, the technology disclosed in U.S. patent application Ser. No. 09/059,278, filed Apr. 13, 1998, by Tamiya, et al., as described above, can be adapted to the present invention. The reference is hereby incorporated herein as reference.

For a highly simplified device, the behavior-planning unit can be very simple. For example, the following conditions can be predetermined:

| Interest | Emotion | Behavior |
|---|---|---|
| Sociality | Happy | Approach |
| Safety | Fearful | Avoid |
| Fatigue | Low | Sleep |
| Curiosity | High | Explore |
| ... | ... | ... |

Further, the behavior-planning unit can be constituted by a multi-dimensional map defined by the generated interest-parameters and the generated emotion-parameters. In the above, if the device has a plurality of moving parts, all moving parts can be allocated on a multi-dimensional map. This approach can be used in combination with a neural network, wherein a multi-dimensional map is connected downstream of the neural network. For example, sensed signals, emotion-parameters, and interest-parameters (these data are stored in the working memory) are used as input signals of the neural network. "APPROACH", "ATTACK", "EXPLORE", "AVOID", "RANDOM", "STILL", etc. are outputted from the neural network. Training the neural network can be conducted off-line. Downstream of the neural network, a multi-dimensional map is connected, which regulates the output in such a way, for example, that if "APPROACH" 0.1 and "EXPLORE" 0.3, the device slowly moves toward the object with a tail slowly moving. Not only the neural network but also the map can be modified by using evolutionary computing technology. Evolutionary reinforcement learning methods does not require teacher data. Evaluation functions can be obtained by using reward signals (e.g., being caressed) or penalty signals (e.g., being hit), instead of teacher data.

Figure 12:
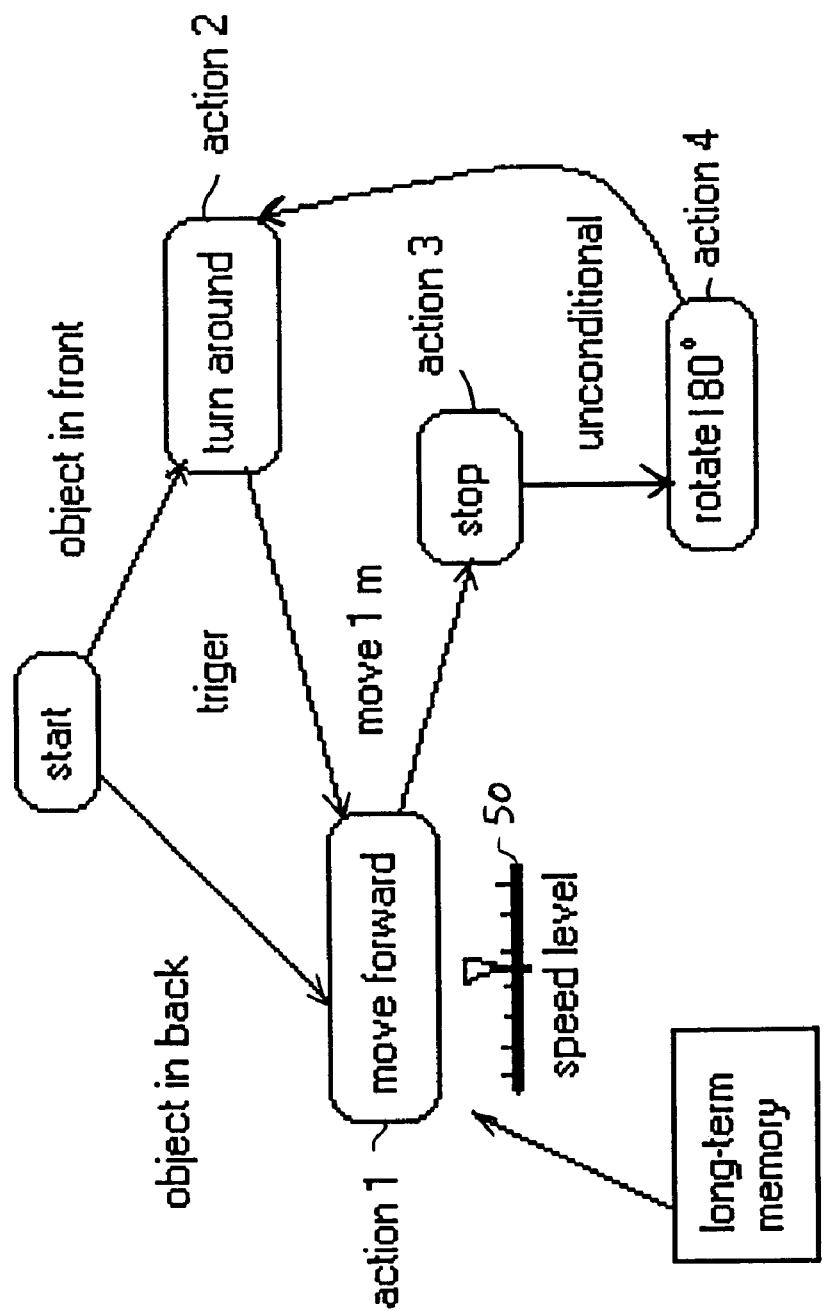
FIG. 12 is a diagram showing an embodiment of a behavior control system in the present invention.
Figure 2:
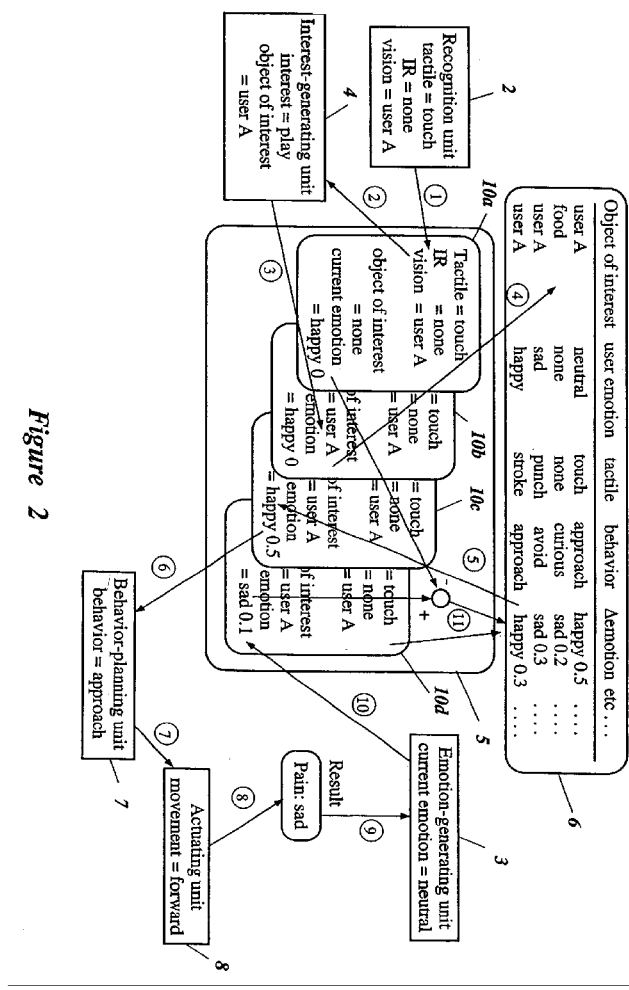

FIG. 12 is a diagram showing an embodiment of a behavior control system. The behavior-planning unit can have a plurality of modules, each regulating one action. The modules can be selected by using technology described above. Each module commands the device's movement sequentially on conditions of the external and internal conditions. FIG. 12 shows an embodiment of a "RUN AWAY" module. If the object is behind the device, the device moves forward (action 1). If the object is in front of the device, the device turns around (action 2). If predetermined conditions are satisfied, action 1 (moving forward) is triggered from action 2. A trigger may be defined by the distance from the object, the moving speed of the object and its direction, the intensity of sound the object is making, the absence of obstacles, etc. The trigger can be determined based on theoretical sum of all of the conditions, each having a trigger range. If the device moves a certain distance, the device stops (action 3). If the device stops, the device turns at 180 degrees without condition (action 4). If the object is close to the device, action 2 is triggered. If the object is not close to the device, the series of actions end. In the above, each action is constituted by a sub-module. Each sub-module can include emotion-parameters. For example, the module for action 1 (moving forward) can be programmed to change the moving speed in accordance with emotion-parameters. If a "FEARFUL" score is high, the device moves faster than when the score is low. If the device moves away from the object, but the device is hit by the object, the "FEARFUL" score becomes high. These data are transferred to the working memory and update the data sheet. The data are saved in the long-term memory. Subsequently, when the device faces the same situation and extracts the data from the long-term memory, the sub-module for action 1 receives a signal to raise the moving speed (50). As described above, the spreadsheet in the long-term memory, the data sheet in the working memory, and the action modules can be modified based on the user's preferences.

Other Features

In the above, if the device does not have sufficient capacity (processing capacity, data storing capacity), the connected toy can be connected to an external system (computer) through cordless networks. That is, the data and/or programs used in the present system, including the long-term memory, the working memory, the emotion-generating unit, the interest-generating unit, and the behavior-planning unit, can be saved or installed in a separable medium such as a compact disc (ROM or RAM) or IC card, so that the user can implant the information in another device. In addition, the data and/or programs can be transmitted to another device via communication means. By using the above technology, plural memory media of plural devices can be hybridized or cross bred to create a new system. The data can be pooled from plural devices and installed into a new device which will possess an extensive memory even if the new device has never been used. By changing the programs, behavior patterns of the device can be changed. Further, any one or more of the intelligent portions of the device including the recognition unit, the emotion-generating unit, the interest-generating unit, and the behavior-planning unit can be installed in a main computer separately from the device, wherein a network is established between the main computer and the device via, for example, the Internet, so that the device can be made compact, and which may need to have simply sensing units, an output unit, and a communication unit for contacting the main computer. Through the sensing units of each device, it is possible to monitor the user or the external environment of each device, by use of the main computer. Further, each device can be connected to other devices to establish a network of devices to exchange information.

Other Aspects

In the present invention, correlations between various inputs and various outputs of the control system can be determined using existing techniques such as neural networks, fuzzy neural networks, and genetic algorithms if the correlations are highly complex, or using existing techniques such as maps and functional equations if the correlations are rather simple. In this regard, Da Ruan (editor) "Intelligent Hybrid Systems—Fuzzy Logic, Neural Networks, and Genetic Algorithms—" Kluwer Academic Publishers (1997), J. -S. R. Jang, C. -T. Sun, E. Mizutani, "Neuro-Fuzzy and Soft Computing" Prentice Hall Upper Saddle River, N.J. 07458 (1997), C. -T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any technique.

Further, in addition to genetic algorithms (GA), genetic programming (GP) or other evolutionary computing techniques can be adapted to the present invention (Wolfgang Banzhaf, et al. (editor), "Genetic Programming, An Introduction", pp. 363–377, 1999, Morgan Kaufman Publishers, Inc., for example). These techniques are sometimes categorized as "heuristic control" which includes evolution, simulated annealing, and reinforcement learning method (S. Suzuki, et al., "Vision-Based Learning for Real Robot: Towards RoboCup", RoboCup—97 Workshop, 23, 24, and 29 August, 1997 Nagoya Congress Center, pp. 107–110; K. and Nurmela, et al., "Constructing Covering Designs By Simulated Annealing", pp. 4–7, Helsinki University of Technology, Digital Systems Laboratory, Technical Reports No. 10, January 1993, for example). These techniques can be adapted to the present invention without complication, based on the principle described earlier; that is, in the present invention, "evolutionary computing" includes the above various techniques.

Further, the evolutionary computing includes a multi-agent system which is used for competitive co-evolution (Tamashiro, et al., "Study about the performance of competitive co-evolution in multi-agent system", Technical Report of the Institute of Electronics, Information and Communication Engineers, NS99-16 (1999-06), pp.37–41).

Further, in the above, neural networks may be used for learning control rules. However, a CMAC (Cerebellar Model Arithmetic Computer) can also be used. The CMAC is excellent in terms of additional learning and the high speed of learning, as compared with the hierarchical neural network.

Other Applications

In the above, the device may be a personal robot, toy robot or robot pet. However, the device of the present control system is not limited to a toy robot, and can be any given control which can be used in a vehicle, an auxiliary drive of a bicycle, or wheelchair, or an industrial robot.

It will be understood by those of skill in the art that numerous and various modifications can be made without departing from the spirit of the present invention. Therefore, it should be clearly understood that the forms of the present invention are illustrative only and are not intended to limit the scope of the present invention.

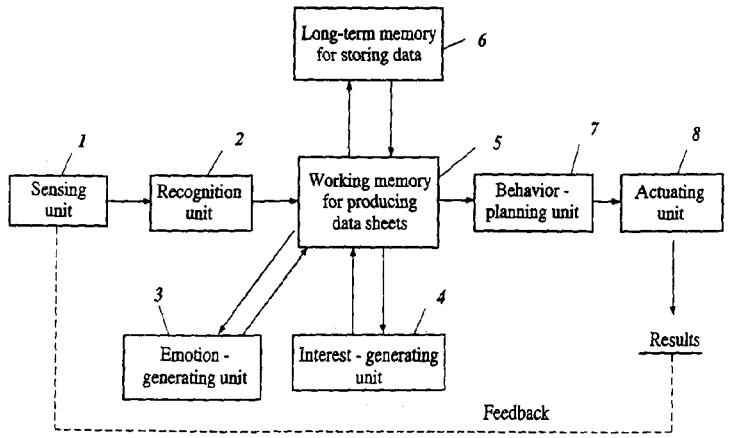

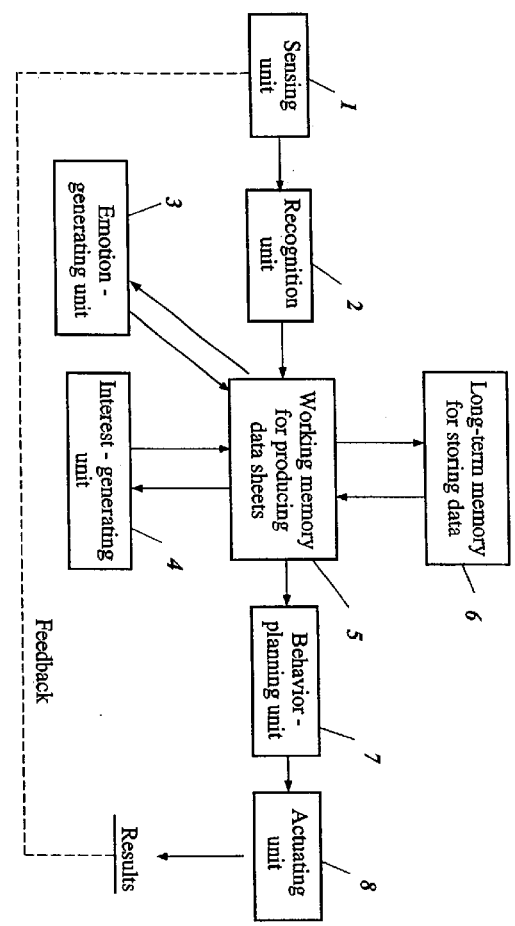

What is claimed is:

1. A method for adjusting behavior of a device based on the device's experience, said device comprising: (i) a sensing unit for sensing signals; (ii) an interest-generating unit programmed to generate interest-parameters; (iii) an emotion-generating unit programmed to generate emotion-parameters; and (iv) an actuating unit for actuating the device, the interest-generating unit and the emotion-generating unit are different units, and the interest-parameters and the emotion-parameters are different sets of parameters, said method comprising the steps of:
(a) selecting an object of interest based on interest-parameters programmed into the device, said interest-parameters being generated by the interest-generating unit, said device having emotion-parameters ($E_i$) generated by the emotion-generating unit;
(b) upon sensing the object, extracting information, if any, on variations of emotions ($\Delta E_{i-1}$) associated with the object from a memory installed separately from the interest-generating unit and the emotion-generating unit, said memory storing under an index of the object, information on variations of emotions ($\Delta E_{i-1}$) previously generated by the device through past interaction with the object;
(c) modifying the initial emotions ($E_i$) of the device with the variations of emotions ($\Delta E_{i-1}$);
(d) actuating the device based on the modified emotions ($E_i+\Delta E_{i-1}$); and
(e) inputting in the memory, under the index of the object, variations of emotions ($\Delta E_i$) generated by the device during interaction with the object, thereby updating the memory.

2. The method according to claim 1, wherein the memory stores variations of emotions ($\Delta E'_i$) under the index of the object, wherein $\Delta E'_i=\alpha\Delta E_i+(1-\alpha)\Delta E_{i-1}$ ($0<\alpha<1$).

3. The method according to claim 1, wherein, in step (b), if no information on the object is stored in the memory, steps (d) and (e) are performed by regarding $\Delta E_{i-1}$ as zero.

4. The method according to claim 3, where, in step (a), if no object of interest is selected because there is no record, an object sensed by the sensing unit is selected as an object of interest.

5. The method according to claim 1, wherein the interest-generating unit comprises a plurality of interest modules, each differently programmed to generate and output an interest-parameter, and the interest-parameter programmed into the device is that which has been assigned a highest score when the object is selected.

6. The method according to claim 1, wherein an input-output relationship of the interest-generating unit is predetermined, said interest-generating unit receiving pre-selected sensed signals and outputting the interest-parameters.

7. The method according to claim 1, wherein an input-output relationship of the emotion-generating unit is predetermined, said emotion-generating unit receiving pre-selected sensed signals and an output of the interest-generating unit, and outputting the emotion-parameters.

8. The method according to claim 1, wherein an input-output relationship of the actuating unit is predetermined, said actuating unit receiving pre-selected sensed signals and the information extracted from the memory, and actuating the device.

9. The method according to claim 1, further comprising a working memory which temporarily pools and stores information from the sensing unit, the interest-generating unit, the emotion-generating unit, and the memory used in step (b) until the device completes its action, and which outputs information to the interest-generating unit, the actuating unit, and the memory used in step (b).

* * * * *

UNITED STATES PATENT AND TRADEMARK OFFICE
CERTIFICATE OF CORRECTION

PATENT NO. : 6,604,091 B2
DATED : August 5, 2003
INVENTOR(S) : Naoki Sadakuni

It is certified that error appears in the above-identified patent and that said Letters Patent is hereby corrected as shown below:

Title page,
Delete the title page and substitute therefore with the attached title page.

Drawings,
Delete drawing sheets 1-12 and substitute therefore with the drawing sheets, consisting of Figs. 1-12, as shown on the attached pages.

Signed and Sealed this

Fifth Day of October, 2004

JON W. DUDAS
*Director of the United States Patent and Trademark Office*

(12) United States Patent
Sadakuni

(10) Patent No.: US 6,604,091 B2
(45) Date of Patent: Aug. 5, 2003

(54) INTERACTIVE ARTIFICIAL INTELLIGENCE

(75) Inventor: Naoki Sadakuni, Iwata (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 09/393,146

(22) Filed: Sep. 10, 1999

(65) Prior Publication Data

US 2003/0069863 A1 Apr. 10, 2003

(51) Int. Cl.$^7$ ................................................. G06F 15/18
(52) U.S. Cl. ........................................................ 706/14
(58) Field of Search .............................. 706/11, 25, 20, 706/14

(56) References Cited

U.S. PATENT DOCUMENTS

| | | | |
|---|---|---|---|
| 5,682,469 A | 10/1997 | Linnett et al. | 345/473 |
| 5,852,819 A | 12/1998 | Beller | 707/1 |
| 5,870,730 A * | 2/1999 | Furuya et al. | 706/47 |
| 5,999,895 A | 12/1999 | Forest | 704/1 |
| 5,999,908 A | 12/1999 | Abelow | 705/1 |
| 6,005,549 A | 12/1999 | Forest | 345/157 |
| 6,034,652 A | 3/2000 | Freiberger et al. | 345/730 |
| 6,085,183 A * | 7/2000 | Horn et al. | 706/45 |
| 6,195,651 B1 | 2/2001 | Handel et al. | 707/2 |
| 6,219,657 B1 * | 4/2001 | Hatayama | 706/14 |

FOREIGN PATENT DOCUMENTS

| | | |
|---|---|---|
| JP | 10-328422 | 12/1998 |
| JP | 11-126017 | 5/1999 |

OTHER PUBLICATIONS

Takanori Shibata et al; Artificial Emotional Creature for Human–Machine Interaction; Jan. 1997; IEEE; 0-7803-4053;2269-2274.*

Hiroshi Kobayashi et al; Facial Interaction between Animated 3D Face Robot and Human Beings; Jan. 1997; IEEE; 0-7803-4053; 3732-3737.*

* cited by examiner

Primary Examiner—John Follansbee
Assistant Examiner—Joseph P. Hirl
(74) Attorney, Agent, or Firm—Knobbe, Martens, Olson & Bear LLP

(57) ABSTRACT

Behavior of a device is modified based on the device's experience. The device comprises: (i) a sensing unit for sensing signals; (ii) an interest-generating unit programmed to generate interest-parameters in response to the sensed signals; (iii) an emotion-generating unit programmed to generate emotion-parameters in response to the sensed signals; and (iv) an actuating unit for actuating the device. The device collects information based on its interest and modifies its behavior when the device observes the same object as previously, based on variations of emotions generated when the device observed the object in the past.

9 Claims, 12 Drawing Sheets